United States Patent
Toma et al.

(10) Patent No.: US 10,691,208 B2
(45) Date of Patent: Jun. 23, 2020

(54) TOUCHSCREEN PANEL HAPTICS

(71) Applicant: Cambridge Touch Technologies Ltd., Cambridge (GB)

(72) Inventors: Silviu Toma, Craiova (RO); Babak Bastani, Royston (GB)

(73) Assignee: Cambridge Touch Technologies Ltd., Cambridge (GB)

(*) Notice: Subject to any disclaimer, the term of this patent is extended or adjusted under 35 U.S.C. 154(b) by 0 days.

(21) Appl. No.: 15/964,592

(22) Filed: Apr. 27, 2018

(65) Prior Publication Data
US 2018/0335846 A1    Nov. 22, 2018

(30) Foreign Application Priority Data
Apr. 27, 2017    (GB) .................................. 1706710.9

(51) Int. Cl.
*G06F 3/01*    (2006.01)
*G06F 3/041*    (2006.01)
*G06F 3/044*    (2006.01)

(52) U.S. Cl.
CPC ............ *G06F 3/016* (2013.01); *G06F 3/0416* (2013.01); *G06F 3/044* (2013.01); *G06F 3/0414* (2013.01)

(58) Field of Classification Search
CPC   G06F 3/016; G06F 3/038; H04R 1/40; H04R 2217/03
See application file for complete search history.

(56) References Cited

U.S. PATENT DOCUMENTS 9,030,726 B2 * 5/2015 Griswold .............. G02F 1/1347
                                                359/285
9,360,937 B2 * 6/2016 Rosenberg .............. F41A 17/06
(Continued)

FOREIGN PATENT DOCUMENTS

| EP | 3035158 A1 | 6/2016 |
| KR | 20110039118 A1 | 4/2011 |
| WO | 2017051973 A1 | 3/2017 |

OTHER PUBLICATIONS

International Search Report in PCT Application PCT/GB2018/051119, dated May 7, 2018, 4 pages.
(Continued)

*Primary Examiner* — William Lu

(57) ABSTRACT

A touchscreen system for generating localised haptic excitations includes a touchscreen panel for measuring force and/or capacitance. The touchscreen system includes one or more first piezoelectric transducers arranged to generate excitations in the touchscreen panel along a first line. The touchscreen system includes one or more second piezoelectric transducers arranged to generate excitations in the touchscreen panel along a second line which is inclined to the first line at an angle. The touchscreen system includes a pressure and/or capacitance sensing module connected to the touchscreen panel and configured to measure a force and/or capacitance from the touchscreen panel. The touchscreen system includes a haptic driving module connected to the first and second piezoelectric transducers and configured to generate user perceptible haptic excitation by driving the first piezoelectric transducers at a first frequency, and driving the second piezoelectric transducers at a second frequency, wherein the difference of the first and second frequencies is a beating frequency, and the beating frequency is a frequency perceptible by human skin, or by driving the first and second piezoelectric transducers at a
(Continued)

carrier frequency which is modulated at a modulation frequency which is a frequency perceptible by human skin. The angle is selected to cause Moiré fringes between excitations generated along the first line and the second line.

12 Claims, 27 Drawing Sheets

(56) References Cited

U.S. PATENT DOCUMENTS

| | | | |
|---|---|---|---|
| 9,727,157 B2 | 8/2017 | Ham et al. | |
| 10,101,811 B2* | 10/2018 | Carter | H04R 1/40 |
| 2006/0290662 A1* | 12/2006 | Houston | A63F 13/06 |
| | | | 345/156 |
| 2009/0146533 A1* | 6/2009 | Leskinen et al. | H01L 41/09 |
| | | | 310/338 |
| 2010/0225596 A1 | 9/2010 | Eldering | |
| 2011/0141052 A1* | 6/2011 | Bernstein | G06F 3/016 |
| | | | 345/174 |
| 2011/0156539 A1* | 6/2011 | Park | H01L 41/083 |
| | | | 310/366 |
| 2012/0025742 A1* | 2/2012 | Masahiko | B06B 1/0207 |
| | | | 318/114 |
| 2012/0166145 A1* | 6/2012 | Kent | G06F 3/0418 |
| | | | 702/191 |
| 2013/0307789 A1 | 11/2013 | Karamath et al. | |
| 2014/0015777 A1* | 1/2014 | Park | G06F 3/044 |
| | | | 345/173 |
| 2014/0062927 A1* | 3/2014 | Hirose | G06F 3/016 |
| | | | 345/173 |
| 2014/0347322 A1* | 11/2014 | Kamata | G06F 3/041 |
| | | | 345/174 |
| 2015/0108854 A1* | 4/2015 | Akasaka | H04M 19/047 |
| | | | 310/25 |
| 2015/0192995 A1 | 7/2015 | Subramanian et al. | |
| 2015/0277565 A1* | 10/2015 | Harris | G06F 3/016 |
| | | | 345/173 |
| 2016/0011666 A1 | 1/2016 | Evreinov et al. | |
| 2016/0147262 A1* | 5/2016 | Lee | G06F 1/1626 |
| | | | 345/173 |

OTHER PUBLICATIONS

Written Opinion of the International Searching Authority in PCT Application PCT/GB2018/051119, dated Nov. 1, 2018, 9 pages.
Examination Report From the UK Patent Office, dated Sep. 9, 2019, for UK Application No. GB1706710.9.
Search Report From the UK Patent Office, dated Sep. 9, 2019, for UK Application No. GB1706710.9.
Combined Search and Examination Report under Sections 17 and 18(3) for UK application No. GB1706710.9, dated Sep. 25, 2017, 10 pages.

* cited by examiner

TOUCHSCREEN PANEL HAPTICS

FIELD OF THE INVENTION

The present invention relates to haptic excitation of a touchscreen panel. The present invention also relates to localised haptic excitation of a touchscreen panel.

BACKGROUND

Haptic excitations/vibrations are employed in mobile devices such as smartphone and tablets for a variety of applications. A first application is to cause a mobile device which is set to a "silent" mode to vibrate in response to receiving a telephone call, message or other similar notification. A user carrying the mobile device in a pocket may then become aware of the incoming call, message and so forth, even though no audible sound is produced by the mobile device.

Another application of haptics is to provide user feedback relating to input. For example, when a user has touched the correct location of a touchscreen to actuate a button, the mobile device may be caused to vibrate for a short period to provide tactile feedback confirming the button actuation. Such feedback can augment audible button "click" sounds, or replace them for quiet or silent operation of the phone.

Conventionally, mobile devices use rotary mass or linear resonant actuators in order to generate such haptic excitations/vibrations. However, such devices can be bulky and may consume relatively large amounts of energy, reducing the length of time that a mobile device can operate on battery power.

Conventional vibration of mobile devices and touchscreens is non-localised. With the aim of improving user experience, there has been interest in trying to localise excitations/vibrations to particular locations of a touchscreen.

For example, US 2015/0277565 A1 describes a touch sensitive device comprising a panel capable of supporting bending waves, a user-accessible touch sensitive screen on or forming part of a face of the panel, the touch sensitive screen having a plurality of different sensing areas, a plurality of vibration exciters coupled to the panel to apply bending waves to the panel to provide tactile feedback at the plurality of sensing areas in response to the user touching a sensing area, and signal processing means arranged to apply signals to the vibration exciters so as to steer bending waves applied to the panel by the plurality of vibration exciters whereby the amplitude of the applied bending waves is maximised at the sensing area touched by the user and reduced or minimised at each other sensing area.

SUMMARY

The present invention seeks to provide improvements in generating haptic excitations for a touchscreen panel.

According to a first aspect of the invention there is provided a touchscreen system for generating localised haptic excitations, including a touchscreen panel for measuring force and/or capacitance. The touchscreen system includes one or more first piezoelectric transducers arranged to generate excitations in the touchscreen panel along a first line. The touchscreen system includes one or more second piezoelectric transducers arranged to generate excitations in the touchscreen panel along a second line which is inclined to the first line at an angle. The touchscreen system includes a pressure and/or capacitance sensing module connected to the touchscreen panel and configured to measure a force and/or capacitance from the touchscreen panel. The touchscreen system includes a haptic driving module connected to the first and second piezoelectric transducers and configured to generate user perceptible haptic excitation by driving the first piezoelectric transducers at a first frequency, and driving the second piezoelectric transducers at a second frequency, wherein the difference of the first and second frequencies is a beating frequency, and the beating frequency is a frequency perceptible by human skin, or by driving the first and second piezoelectric transducers at a carrier frequency which is modulated at a modulation frequency which is a frequency perceptible by human skin. The angle is selected to cause Moiré fringes between excitations generated along the first line and the second line.

Thus, through localisation of haptic excitations using Moiré fringes, localised haptics excitation may be generated more simply and requiring less computation than directly calculating phase shifts to cause constructive interference at an arbitrary position of a touchscreen panel. Further, since the first and second piezoelectric transducers are not required to be driven at frequencies perceptible be human skin, the first and second piezoelectric transducers may be driven at higher frequencies having correspondingly shorter wavelengths. Thus, more spatial localisation of haptic excitations may have improved spatial resolution.

The haptic driving module may be further configured to control the spacing of the Moiré fringes by selecting the first and second frequencies in dependence upon the angle, or to control the spacing of the Moiré fringes by selecting the carrier frequency in dependence upon the angle.

The touchscreen system may further include one or more third piezoelectric transducers arranged to generate excitations in the touchscreen panel along a third line which is inclined to the first line at a second angle, wherein the second angle may be different to the angle. The haptic driving module may be further connected to the third piezoelectric transducers. The haptic driving module may be further configured to control the spacing of the Moiré fringes by driving the first piezoelectric transducers at the first frequency and driving the second piezoelectric transducers at a second frequency, or driving the first and second piezoelectric transducers at the carrier frequency modulated at the modulation frequency. The haptic driving module may be further configured to control the spacing of the Moiré fringes by driving the first piezoelectric transducers at the first frequency and driving the third piezoelectric transducers at a second frequency, or driving the first and third piezoelectric transducers at the carrier frequency modulated at the modulation frequency. The haptic driving module may be further configured to control the spacing of the Moiré fringes by driving the second piezoelectric transducers at the first frequency and driving the third piezoelectric transducers at a second frequency, or driving the second and third piezoelectric transducers at the carrier frequency modulated at the modulation frequency.

The haptic driving module may be further configured to control the spacing of the Moiré fringes by selecting the first and second frequencies in dependence upon the angle, the second angle or a difference between the angle and the second angle. The haptic driving module may be further configured to control the spacing of the Moiré fringes by selecting the carrier frequency in dependence upon the angle, the second angle or a difference between the angle and the second angle.

Each of the first and second piezoelectric transducers may be a discrete ceramic piezoelectric transducer.

The touchscreen panel may include a plurality of first electrodes, at least one second electrode, and a layer of piezoelectric material arranged between the first and second electrodes. Each of the first and second piezoelectric transducers may include one of the first electrodes, at least one second electrode and the layer of piezoelectric material.

Each first electrode may be connected to the haptic driving module and the pressure and/or capacitance sensing module by a switching circuit. Each first electrode may be used for measuring force and/or capacitance.

The first and second piezoelectric transducers, and optionally the third piezoelectric transducers, may be selected from an array of piezoelectric transducers arranged in rows and columns. The first piezoelectric transducers may be a first row or column. The second piezoelectric transducers may be a second, different row or column and the excitations along the second line may be generated by applying a different phase shift to the driving signal for each of the second piezoelectric transducers. Optionally, the third piezoelectric transducers may be a third, different row or column and the excitations along the second line may be generated by applying a different phase shift to the driving signal for each of the third piezoelectric transducers. The array of piezoelectric transducers arranged in rows and columns may be disposed under, over or within the touchscreen panel.

According to a second aspect of the invention there is provided a touchscreen system for generating haptic excitations. The touchscreen system includes a touchscreen panel for measuring force and/or capacitance. The touchscreen system includes one or more first piezoelectric transducers arranged to generate excitations in the touchscreen panel. The touchscreen system includes one or more second piezoelectric transducers arranged to generate excitations in the touchscreen panel. The touchscreen system includes a pressure and/or capacitance sensing module connected to the touchscreen panel and configured to measure a force and/or a capacitance from the touchscreen panel. The touchscreen system includes a haptic driving module connected to the first and second piezoelectric transducers and configured to drive the first piezoelectric transducers at a first frequency, and to drive the second piezoelectric transducers at a second frequency. The difference of the first and second frequencies is a beating frequency, and the beating frequency is a frequency perceptible by human skin.

In this way, the first and second piezoelectric transducers need not be capable of individually generating human perceptible excitations. In other words, the first and second piezoelectric transducers may operate above the frequency ranges which are perceptible by human skin, using beating to generate a human perceptible envelope. High frequency piezoelectric transducers may be smaller, thinner and consume less power compared to rotary mass or linear resonant actuator systems.

The beating frequency may be greater than or equal to 80 Hz. The beating frequency may be less than or equal to 400 Hz. The beating frequency may lie between 80 Hz and 400 Hz inclusive. The beating frequency may be 200 Hz.

Each of the first and second piezoelectric transducers may be a discrete ceramic piezoelectric transducer.

The touchscreen panel may include a plurality of first electrodes, at least one second electrode, and a layer of piezoelectric material arranged between the first and second electrodes. Each of the first and second piezoelectric transducers may include one of the first electrodes, at least one second electrode and the layer of piezoelectric material.

Thus, first and second piezoelectric transducers may be directly integrated into a touchscreen stack-up. This may permit one or more of good mechanical coupling, large excitation areas and a thin profile.

Each first electrode may be connected to the haptic driving module and the pressure and/or capacitance sensing module by a switching circuit, and each first electrode is used for measuring force and/or capacitance.

Thus, by using the same electrodes to measure force and/or capacitance in addition to generating haptic excitations, a touchscreen panel supporting haptic excitations may be simpler and more compact (thinner).

The beating frequency or modulation frequency may be substantially equal to 200 Hz. The beating frequency or modulation frequency may be greater than or equal to 80 Hz. The beating frequency or modulation frequency may be less than or equal to 400 Hz. The beating frequency or modulation frequency may lie between 80 Hz and 400 Hz inclusive.

The carrier frequency may be modulated at the modulation frequency using a sinusoidal envelope. The carrier frequency may be modulated at the modulation frequency using a square wave envelope.

The first frequency and second frequency may exceed a range of human audible frequencies, or the carrier frequency may exceed a range of human audible frequencies. The first frequency and second frequency, or the carrier frequency, may exceed 20,000 Hz.

BRIEF DESCRIPTION OF THE DRAWINGS

Certain embodiments of the present invention will now be described, by way of example, with reference to the accompanying drawings in which.

DETAILED DESCRIPTION

Figure 1:
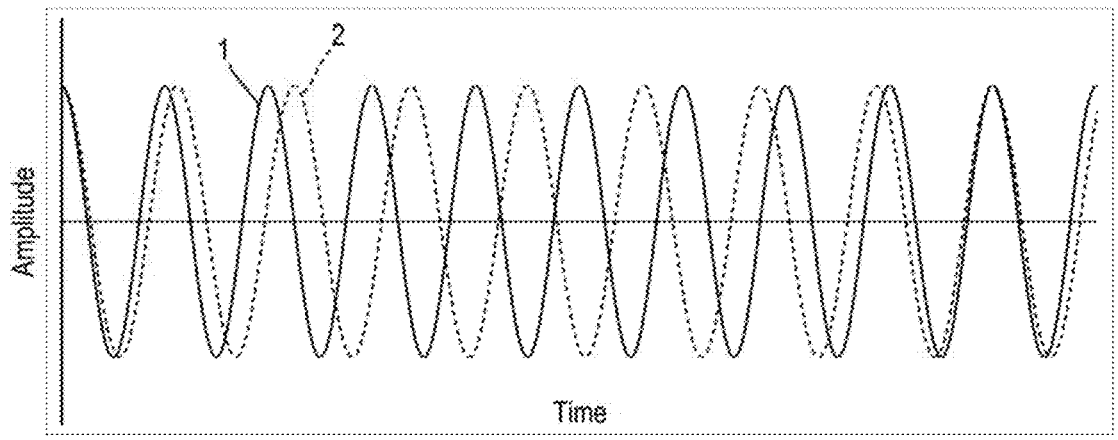
FIGS. 1 and 2 illustrate interference of two harmonic waves resulting in a low frequency envelope modulating a carrier frequency with a higher frequency.

In the following description, like parts are denoted by like reference numerals.

This specification describes methods and systems for generating haptic excitations on a touch sensitive screen using a piezoelectric layer. The piezoelectric layer may be provided by a transparent Polyvinylidene fluoride (PVDF) film. Alternatively, haptic excitations may be generated using a number of discrete ceramic piezoelectric elements mounted within or behind a touchscreen display stack. Haptic excitations are vibrations which may be used to provide feedback to a user of the touchscreen panel.

The present specification also discusses the underlining physiology of haptic excitations when the skin of a user is excited with high frequency modulated signals. High frequencies correspond to smaller wavelengths. This gives more superposition capabilities which leads to potentially better excitation localisation on a touchscreen surface. Better excitation localisation may provide a more refined haptics user experience. However, human skin cannot easily perceive excitations/vibrations at the relatively high frequencies needed to produce good localisation on a touchscreen surface. As shall be explained hereinafter, the present specification addresses the problems of localisation and user perceptibility in a variety of ways such as, for example, by using a pair of high frequency signals which differ in frequency to generating a "beating" envelope at a lower frequency which a user's skin can perceive.

The present specification also analyses the possibility of localised haptic excitations by using Moiré pattern interference. Driving circuits suitable for generating haptic excitations on a touchscreen panel are also described.

Generation and Localisation of Haptic Excitations:

Beating Pattern Principle:

Haptic excitations/vibrations should be perceivable by a user, for example, haptic excitations should be detectable by the skin of a user's digit which contacts a touchscreen panel.

Human skin contains structures termed Pacinian corpuscles, which lie deep in the skin and which are most sensitive to stimulus frequencies in the range of 80 to 400 Hz inclusive. Consequently, generation of haptic excitations is preferably conducted within the range of 80 to 400 Hz inclusive. User perceptibility has been found to be optimal at, or around, a haptic excitation frequency of 200 Hz.

However, the spatial resolution of feedback localisation is limited by the wavelength of the excitation/vibration. Generation of a 200 Hz excitation in a touchscreen panel will limit the possibility for localisation of haptic excitations due the relatively long wavelength of a 200 Hz excitation compared to typical dimensions of touchscreen panels. Higher excitation frequencies correspond to shorter wavelengths and may therefore allow for finer localisation. However, higher frequencies are limited by the perceptibility to a user, and may be perceived with reduced amplitude, if at all.

The problem may be overcome by modulating high frequency haptic excitations with a low frequency envelope, for example an envelope at or around 200 Hz. In this way, the haptic excitations may be made perceptible to the skin of a user.

High frequency haptic excitations may be modulated with a low frequency envelope by employing the phenomenon of "beating", which is a type of interference pattern which may be generated by superposition of a pair of harmonic waves having different frequencies:

$$\cos(2\pi f_1 t) + \cos(2\pi f_2 t) = 2\cos\left(2\pi \frac{f_1 + f_2}{2}\right)\cos\left(2\pi \frac{f_1 - f_2}{2}\right),$$

in which $f_1$ is a first frequency, $f_2$ is a second frequency and t is time.

Figure 2:
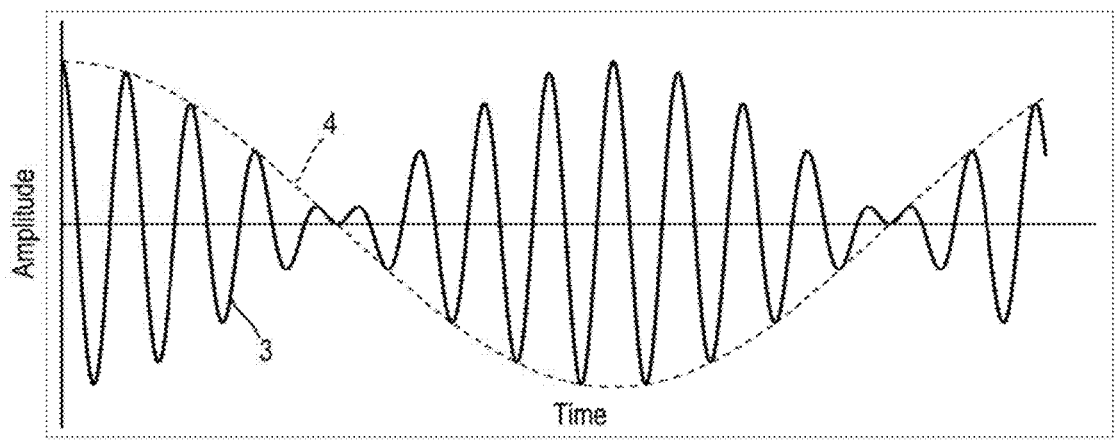

Referring to FIGS. 1 and 2, an example of using beating to generating a low frequency envelope is illustrated.

A first wave 1 has a first frequency $f_1$ and a second wave 2 has a second, different frequency $f_2$. When the difference $f_1-f_2$ is small compared to $f_1$ and $f_2$ the first wave 1 and the second wave 2 are observed to drift in and out of phase over time when plotted separately (FIG. 1).

However, when the first and second waves 1, 2 are superposed, the different rates of phase accumulation give rise, as described by Equation (1), to a sum component 3 (hereinafter "carrier signal") having frequency $(f_1+f_2)/2$ and a modulating difference component 4 (hereinafter "envelope") having frequency $(f_1-f_2)/2$.

Figure 3:
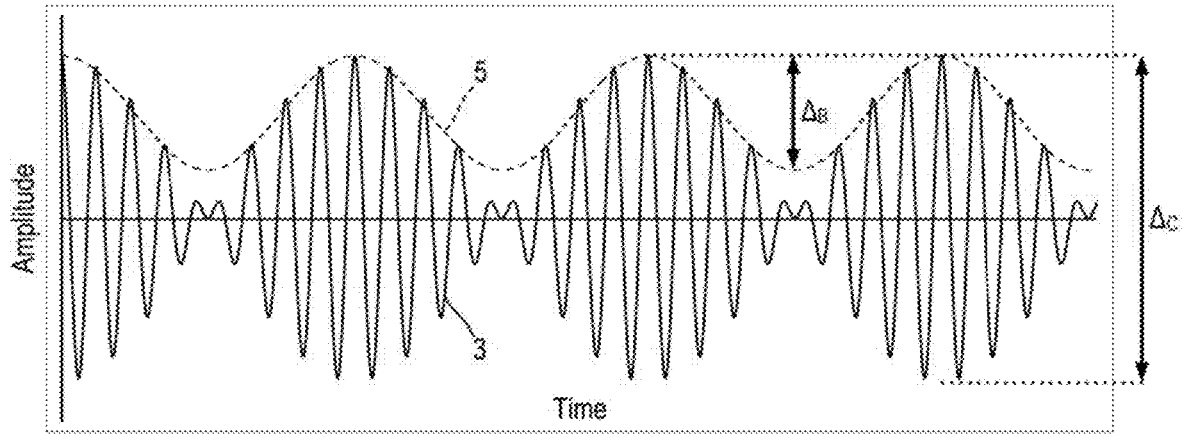
FIG. 3 illustrates the magnitude of a user perceptible signal arising from the carrier signal and envelope shown in FIG. 2.

Referring also to FIG. 3, the user perceptible signal 5 arising from a carrier signal 3 and envelope 4 is shown.

When using the beating pattern approach, only the amplitude of the carrier signal 3 modulated by the envelope 4 will be sensed. This gives rise to an effective user perceptible signal 5 (hereinafter the "beating signal") at twice the envelope frequency of $(f_1-f_2)/2$. Thus, the frequency of the beating 5 is the difference $f_b = f_1 - f_2$.

The peak-to-peak amplitude $\Delta_B$ of the beating signal 5 is about 0.35 of the peak-to-peak amplitude $\Delta_C$ of the carrier wave 3. A practical consequence of this is that the amplitude of a haptic excitation generated using beating between first and second signals 1, 2 will not use the maximum swing of the piezoelectric actuator or actuators generating the first and second signals 1, 2. This may lead to an overall decrease in amplitude of the beating signal 5, compared to driving directly as low frequencies.

Decreases in excitation amplitude of the beating signal 5 may be compensable by selecting frequencies which excite resonances of a touchscreen panel. For example, if the resonance amplitude of a touchscreen panel is 2.9 times higher at a higher frequency than at 200 Hz, then generating a beating signal 5 would result in greater user perceptible amplitude than direct excitation at 200 Hz. In some examples, the touchscreen panel dimensions, materials and layer structure may be engineered to select or tune the resonance frequencies.

Using the beating principle permits use of piezoelectric actuators which are not, in isolation, capable of generating user perceptible vibrations. High frequency actuators may be smaller and thinner, and may replace bulky vibration generators such as rotary masses or linear actuated resonators. For example, high frequency ceramic piezoelectric actuators may be as thin as 100 micrometres, which is thin enough to allow such ceramic actuators to be laminated within a touchscreen panel display stack-up.

Figure 4:
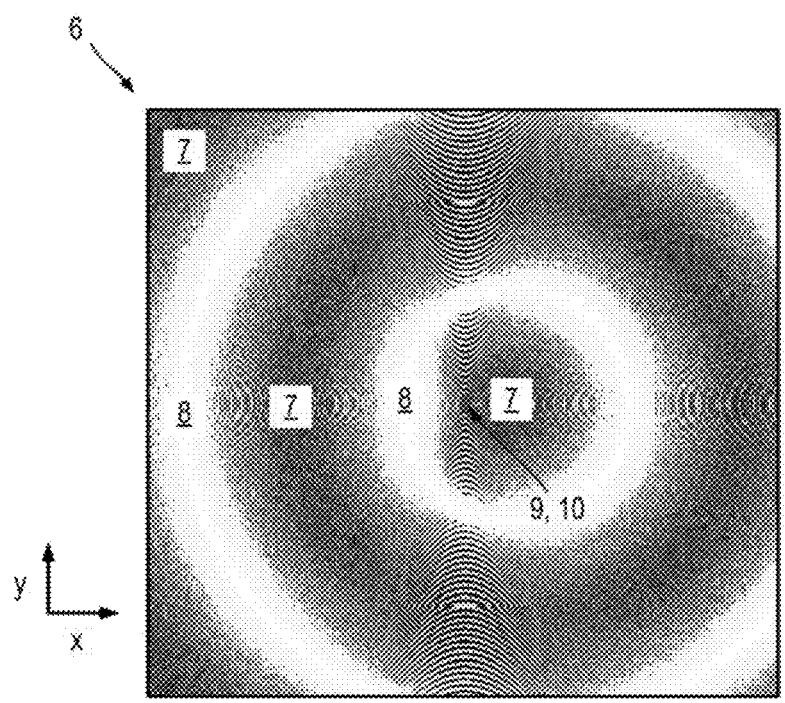
FIG. 4 illustrates a simulation of a radial beating pattern.

Referring also to FIG. 4, a simulation of a radial beating pattern 6 is shown.

The radial beating pattern 6 exhibits an envelope 4 including periodic concentric peaks 7 (dark colours in FIG. 4) and concentric troughs 8 (light colours in FIG. 4). Within the peaks 7 of the envelope, finer structure of the carrier signal 3 can be seen. The radial beating pattern 6 exhibits effects of aliasing in the image, leading to distortions of the otherwise generally concentric circular pattern of peaks 7 and troughs 8.

The radial beating pattern 6 shown in FIG. 4 was generated from interference between first and second actuators 9, to excited at respective first and second frequencies $f_1=40$ kHz, $f_2=40.2$ kHz. The wave speed was assumed to be $c=5,600$ m·s$^{-1}$, corresponding to tempered glass. Tempered glass is frequently employed for the exterior layers of touchscreen panels. For the purposes of simulating the radial beating pattern 6, the tempered glass was assumed to be thin and unconstrained. The first and second actuators 9, 10 were separated in the y direction by a fraction of 0.321 of the wavelength $\lambda_1=140$ mm corresponding to the first frequency $f_1$. Measuring the distance between two adjacent peaks 7 shows the expected beating frequency of $f_B=200$ Hz.

Localisation Approach:

In order to obtain localisation of haptic excitations on a touchscreen panel, a more controlled method of producing beating patterns is needed. In a preferred method, Moiré patterns/fringes have been used.

A Moiré pattern or Moiré fringes represents secondary and visually evident superimposed pattern created, for example, when two identical or nearly identical patterns, for example closely spaced straight lines drawn radiating from a point or taking the form of a grid, are overlaid while displaced or rotated a small amount from one another.

Figure 5:
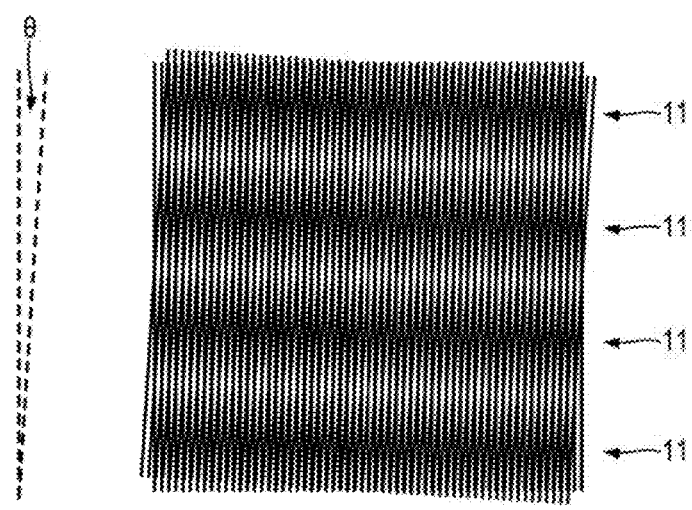
FIG. 5 illustrates Moiré fringes.

Referring also to FIG. 5, an example of Moiré fringes 11 between two sets of parallel lines is shown.

The Moiré fringes 11 result from an angular displacement, θ, between first and second arrays of closely spaced lines. One manifestation of Moiré fringes is the hereinbefore described beating phenomenon which may occur in a variety of wave interference conditions.

In order to obtain Moiré fringes for the purpose of localising haptic vibrations on a touchscreen panel, excitations/vibrations should be generated as parallel lines, or as close to parallel lines as is possible in practical circumstances. There are several approaches to produce such excitations in practice. In some examples, linear piezoelectric actuators may be used. In other examples, an array of actuators may be used which are spaced such that destructive interference occurs at points along a line, for example, along a line connecting the actuators. Using excitation at higher frequencies is advantageous as this permits the actuators to be spaced more closely whilst maintaining destructive interference between adjacent actuators.

Figure 6:
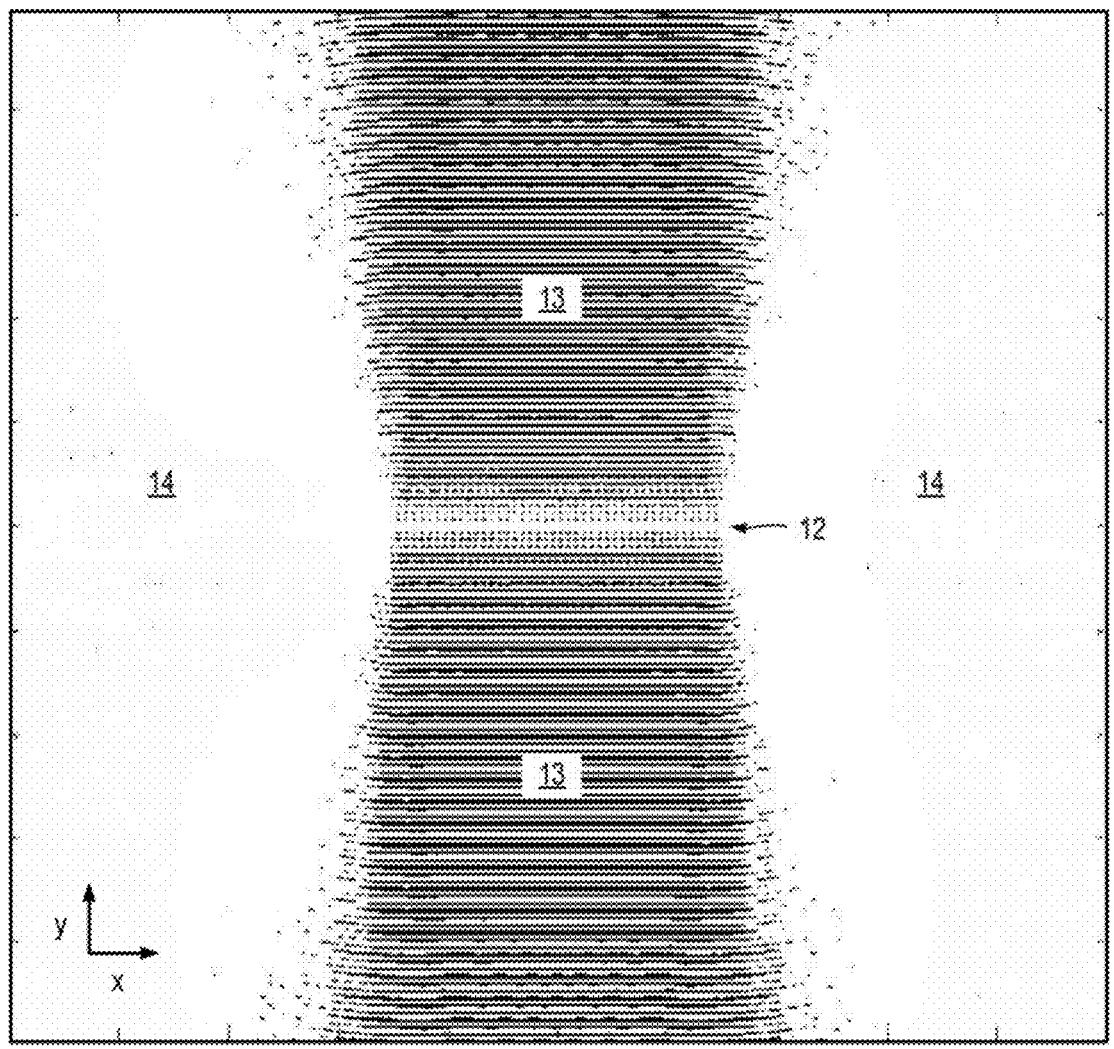
FIG. 6 illustrates a simulation of using a linear array of actuators to provide a linear vibration source.

Referring also to FIG. 6, a simulation showing the use of a linear array of actuators 12 to provide an effective linear excitation source is shown.

In FIG. 6, black or dark shading indicates relatively high amplitude and white or light shading indicate relatively low amplitude. The linear array of actuators 12 included 68 separate actuators, each operating at a frequency of 40 kHz. The actuators forming the linear array 12 were spaced out with separation equal to a fraction of 0.625 of the wavelength. The linear array of actuators 12 are expected to result in lobes 13 of strong excitation above and below the linear array 12, and regions 14 of low or negligible excitation to either side of the linear array 12. Good confinement of excitation within the length of the linear array 12 is expected. Within the lobes 13, excitations/vibrations are expected to be generally linear, with increasing curvature near to the edges of the linear array 12. In order to obtain Moiré fringes, i.e. beating, a second linear array 15 (FIG. 7) may be added at an angle θ.

Figure 7:
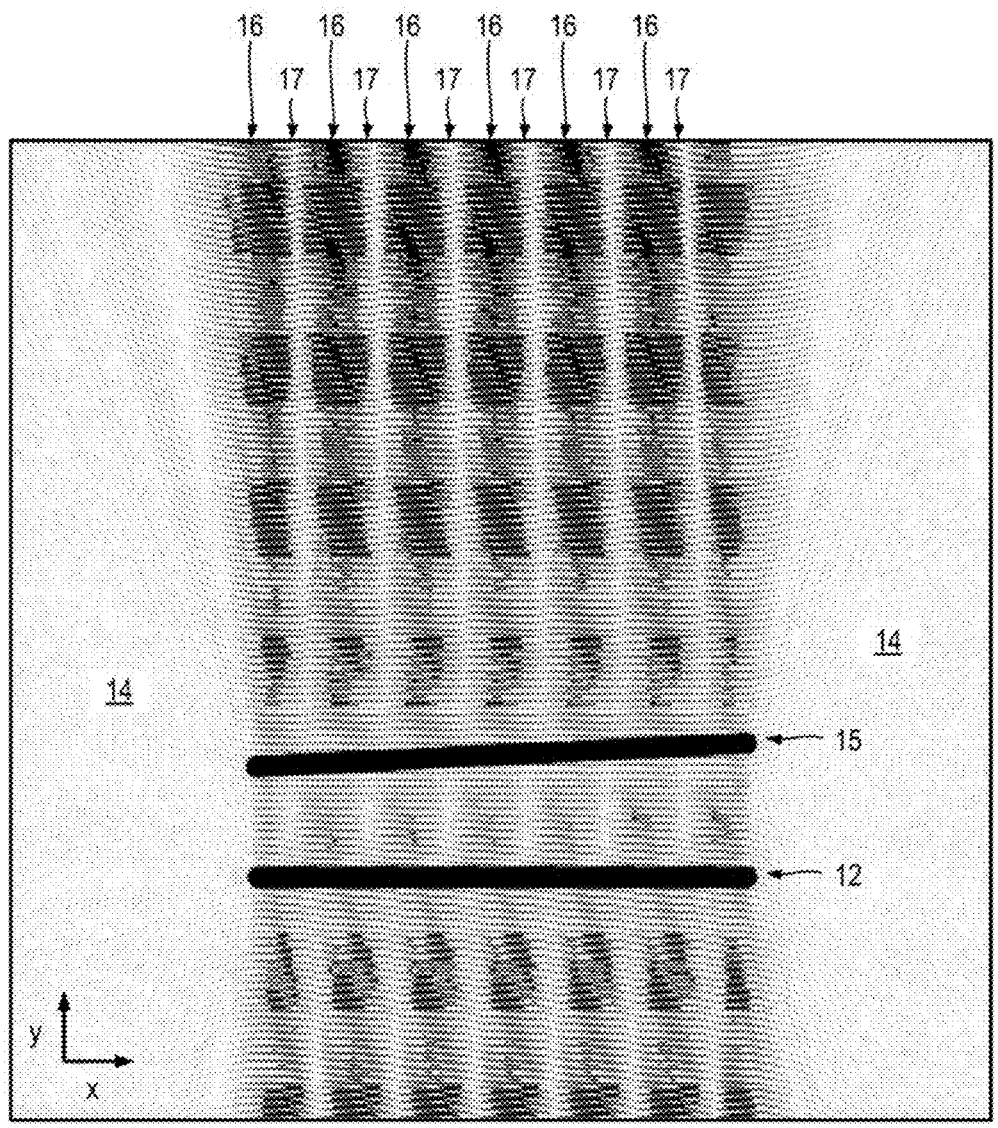
FIG. 7 illustrates, in the x-y plane, a simulation of using first and second linear arrays of actuators to generate Moiré fringes 16.

Referring also to FIG. 7, a simulation showing the use of first and second linear arrays of actuators 12, 15 to generate Moiré fringes 16 is shown.

In FIG. 7, black or dark shading indicates relatively high amplitude and white or light shading indicates relatively low amplitude. The amplitudes shown in FIG. 7 correspond to a single instant of time. For the simulation shown in FIG. 7, the first linear array 12 included 263 separate actuators, each operating at a frequency of 36.9 kHz. The actuators forming the first linear array 12 were spaced out with separation equal to a fraction of 0.5 of the wavelength. The second linear array 15 also included 263 separate actuators, each operating at a frequency of 36.9 kHz. The actuators forming the second linear array 15 were also spaced out with separation was equal to a fraction of 0.5 of the wavelength, but along a line inclined at an angle of 2.7 degrees to the first linear array 12. The separation of the first and second linear arrays 12, 15 in the y direction ranged from a minimum of about 30 wavelengths to a maximum of about 36 wavelengths.

Moiré fringes 16 extending generally perpendicular to the linear arrays 12, 15 were observed, separated by troughs 17. Good confinement of excitations within the length of the linear array 12 was observed, with regions 14 of low or negligible excitation to either side of the linear arrays 12, 15.

Figure 8A:
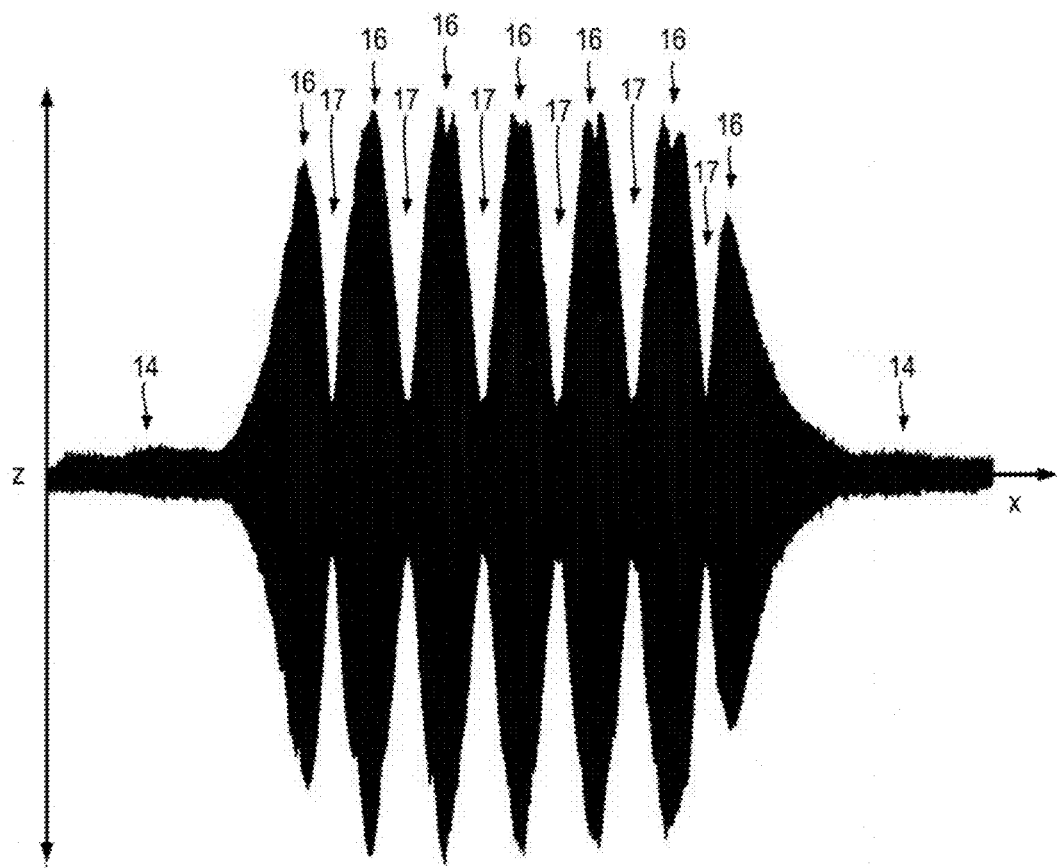
FIG. 8A shows the simulation data of FIG. 7 projected into the x-z coordinate plane.

Referring also to FIG. 8A, the simulation data of FIG. 7 is shown projected into the x-z coordinate plane (with z as amplitude). It may be observed that the Moiré fringes 16 are modulated by a sinusoidal envelope, the frequency of which can be controlled.

Figure 8B:
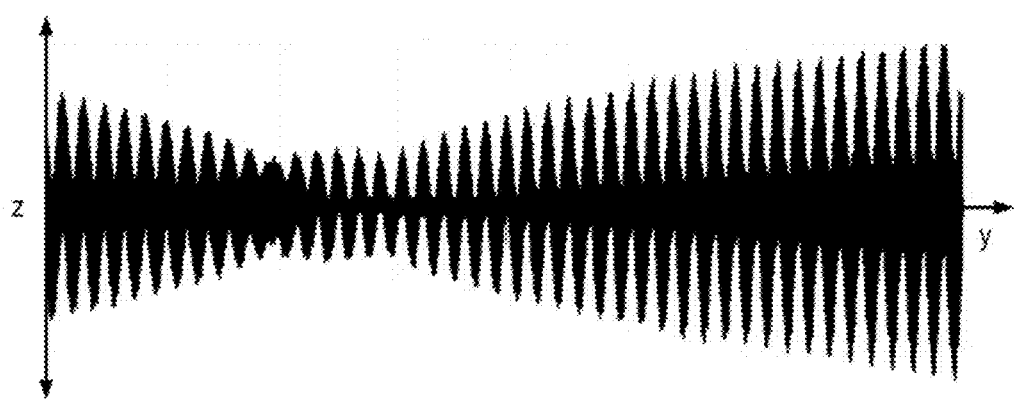
FIG. 8B shows the simulation data of FIG. 7 projected into the y-z coordinate plane.
Figure 9A:
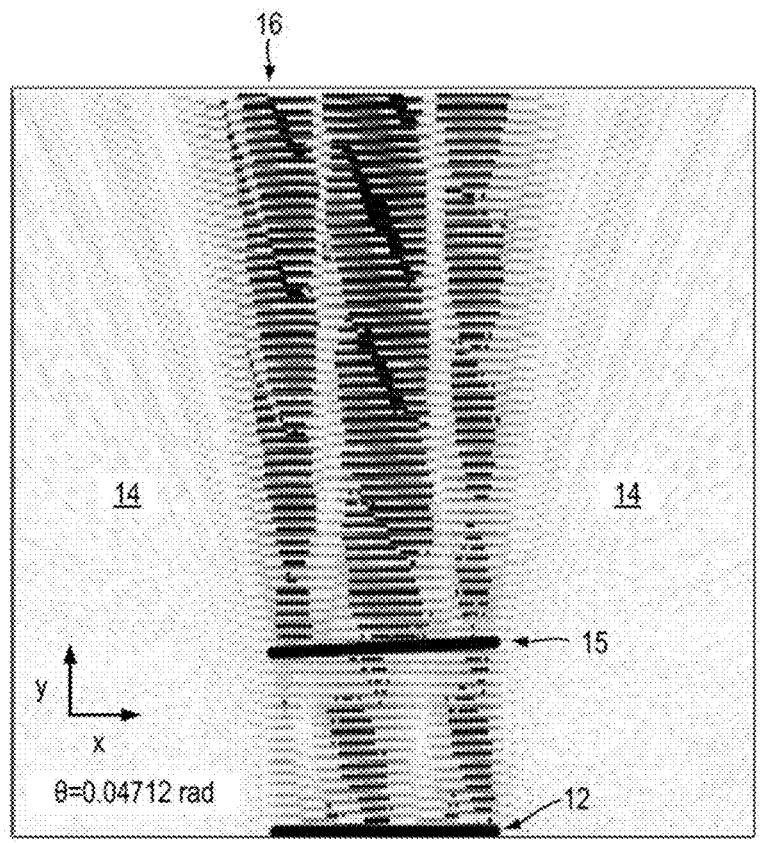
FIGS. 9A to 9G, illustrate the results of simulations which show variations in a pattern of Moiré fringes with the angle between first and second linear arrays.
Figure 9B:
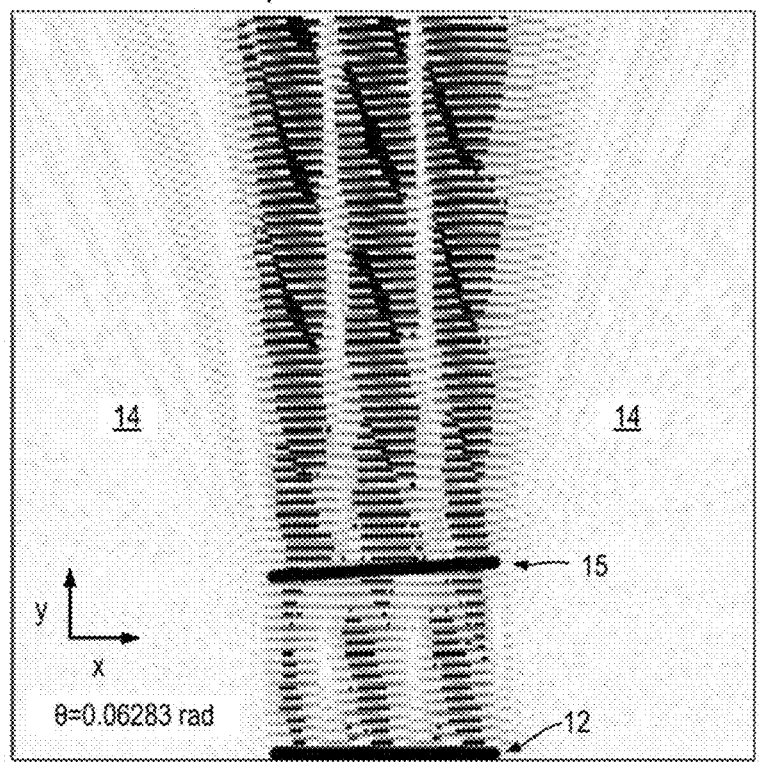
Figure 9C:
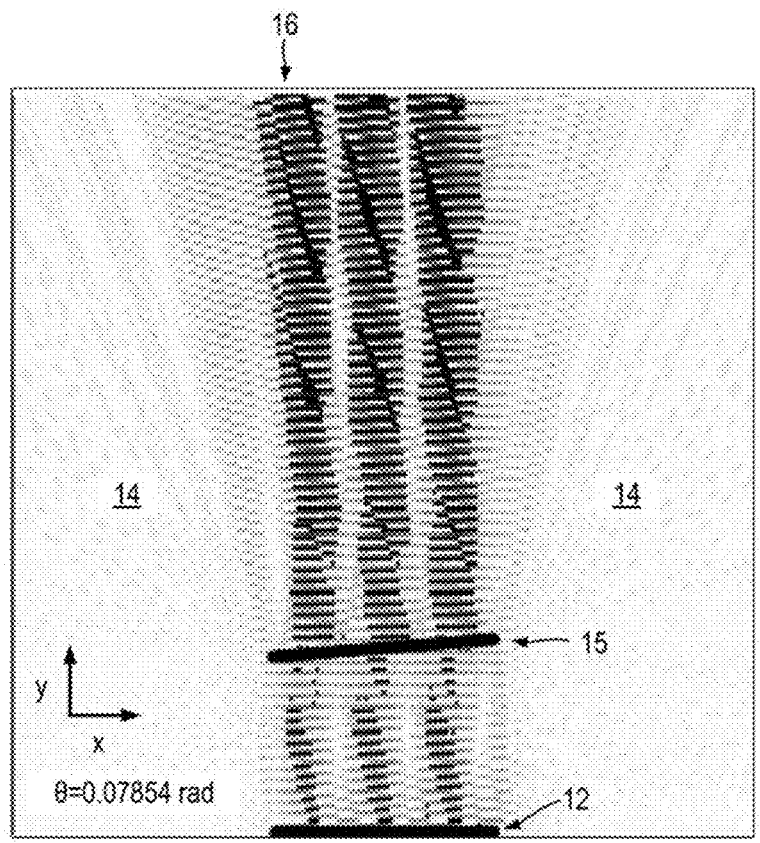
Figure 9D:
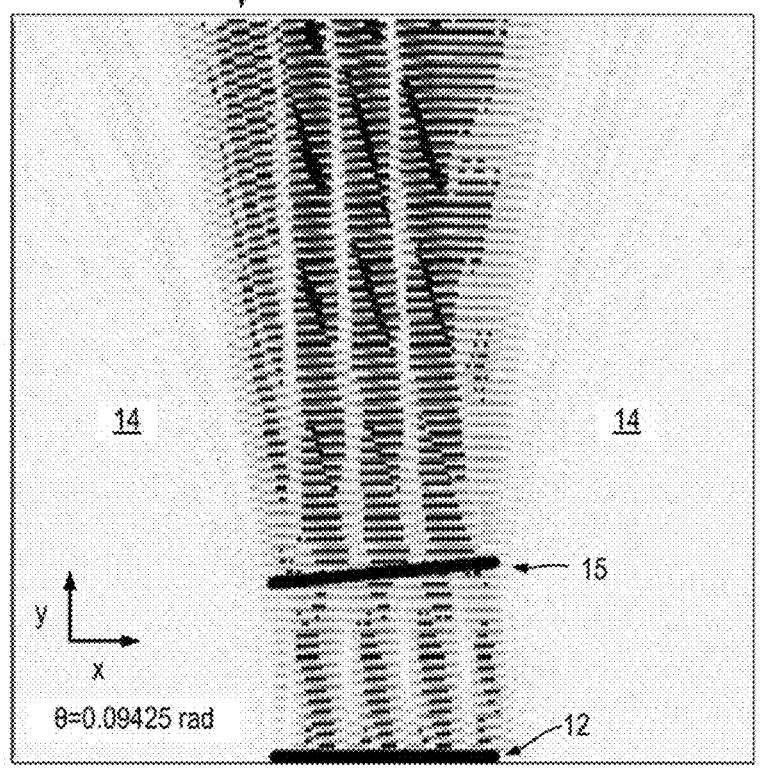
Figure 9E:
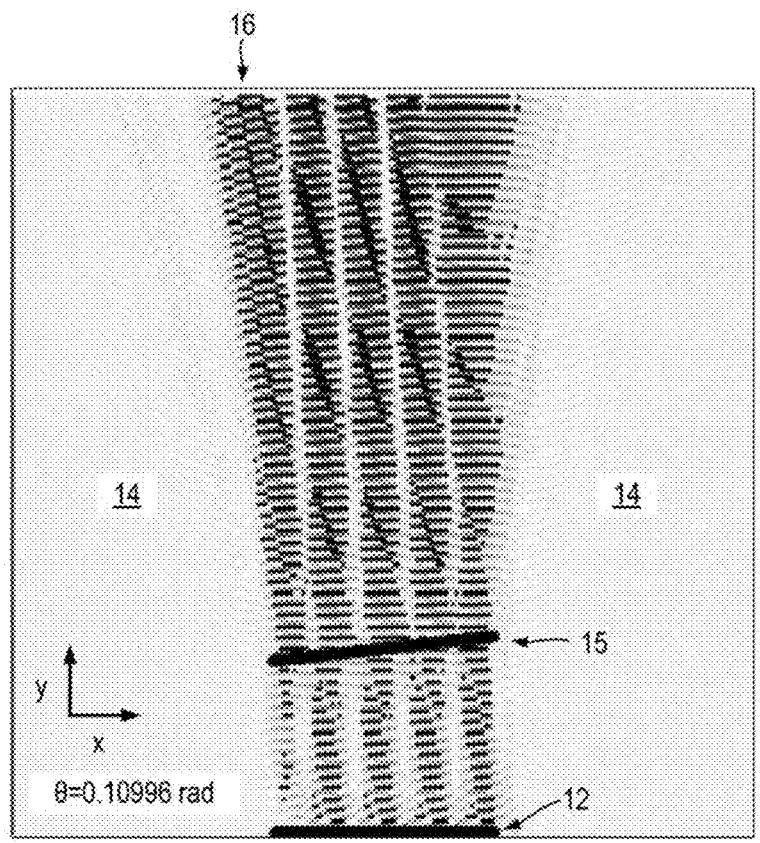
Figure 9F:
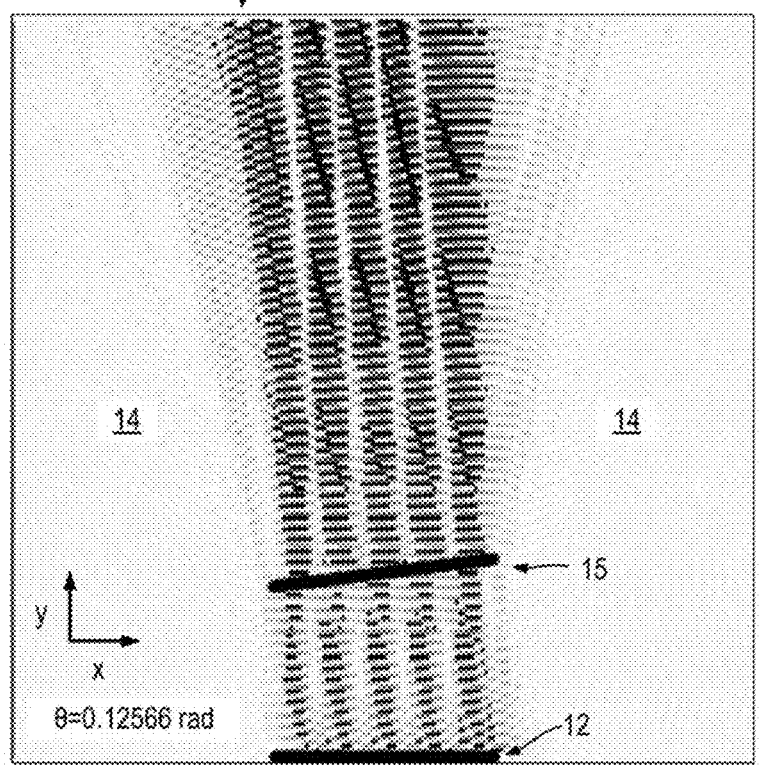
Figure 9G:
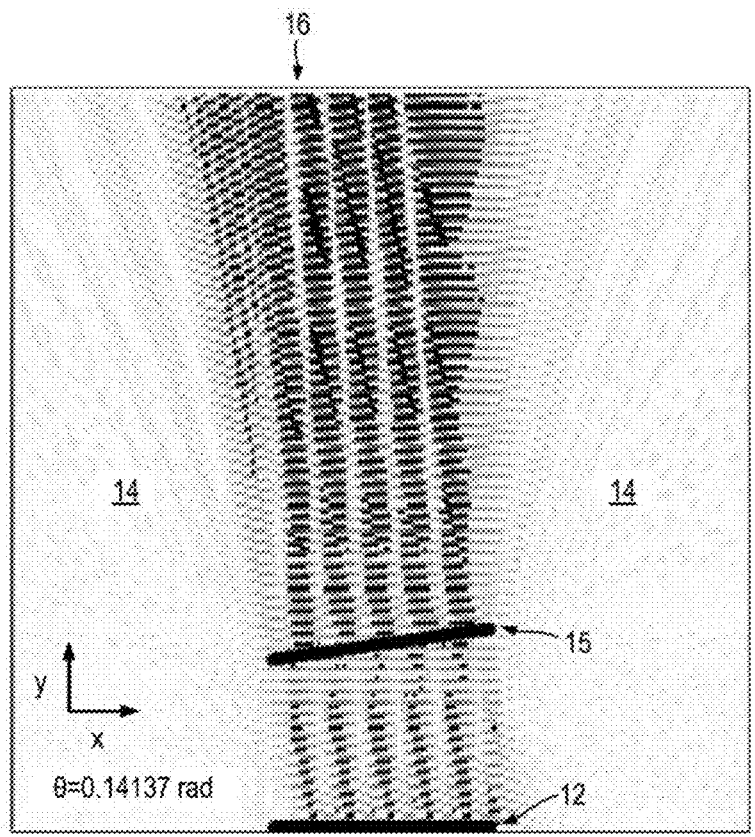

Referring also to FIG. 8B, the simulation data of FIG. 7 is shown projected into the y-z coordinate plane (with z as amplitude). The carrier oscillation can be observed in this projection.

Variation of Moiré Fringe Pattern with Angle:

Referring also to FIGS. 9A to 9G, the results of simulations are shown which illustrate variations in the pattern of Moiré fringes 16 with the angle θ between first and second linear arrays 12, 15.

In FIGS. 9A to 9G, black or dark shading indicates relatively high amplitude and white or light shading indicates relatively low amplitude. The amplitudes shown in FIGS. 9A to 9G correspond to a single instant of time. The simulation data shown in FIGS. 9A to 9G have been calculated in a similar manner to the data shown in FIG. 7 and FIGS. 8A and 8B, except that each of the first and second arrays 12, 16 included 79 actuators. Otherwise, the actuators each operated at a frequency of 36.9 kHz and were spaced apart by a distance of 0.5 times the wavelength. The centre-to-centre distance of the first and second arrays 12, 15 was about 33 wavelengths.

It may be observed that with increasing angle θ the period of Moiré fringes 16 is decreased. The precise positions of the Moiré fringes 16 are also observed to vary. In this way, small changes in the angle θ of inclination between first and second linear arrays 12, 15 could be used to provide haptic vibrations localised to specific locations of a touchscreen.

Figure 10:
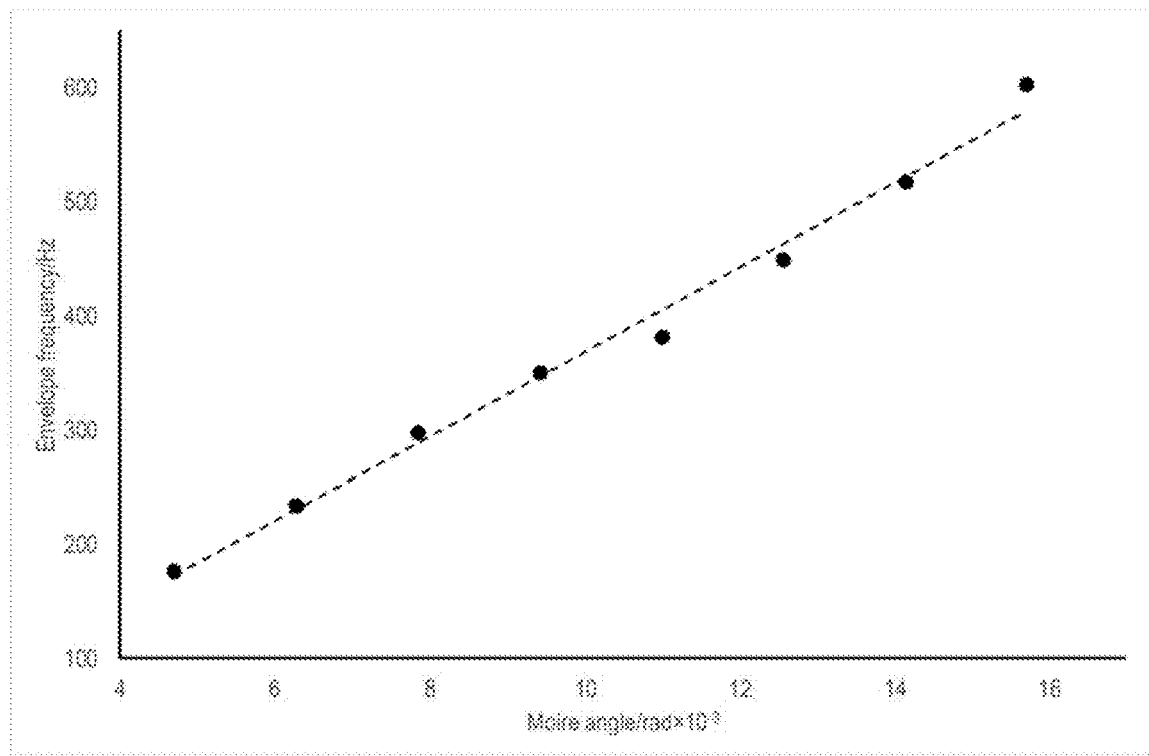
FIG. 10 is a graph showing the variation of Moiré fringe envelope frequency with angle.
Figure 11A:
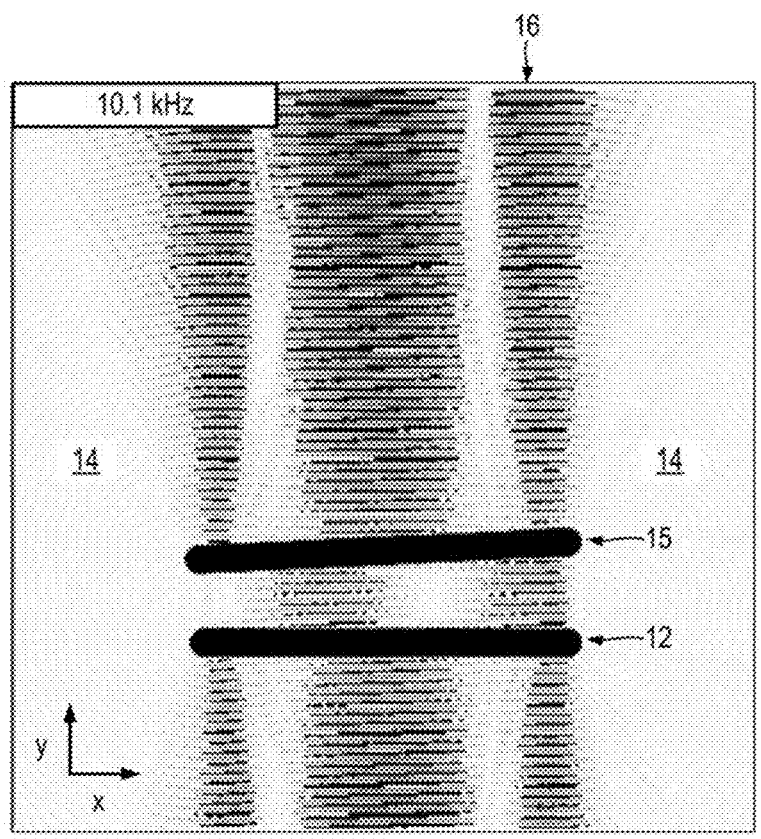
FIGS. 11A to 11F illustrate the results of simulations which show variations in a pattern of Moiré fringes with the frequency of excitation for first and second linear arrays.
Figure 11B:
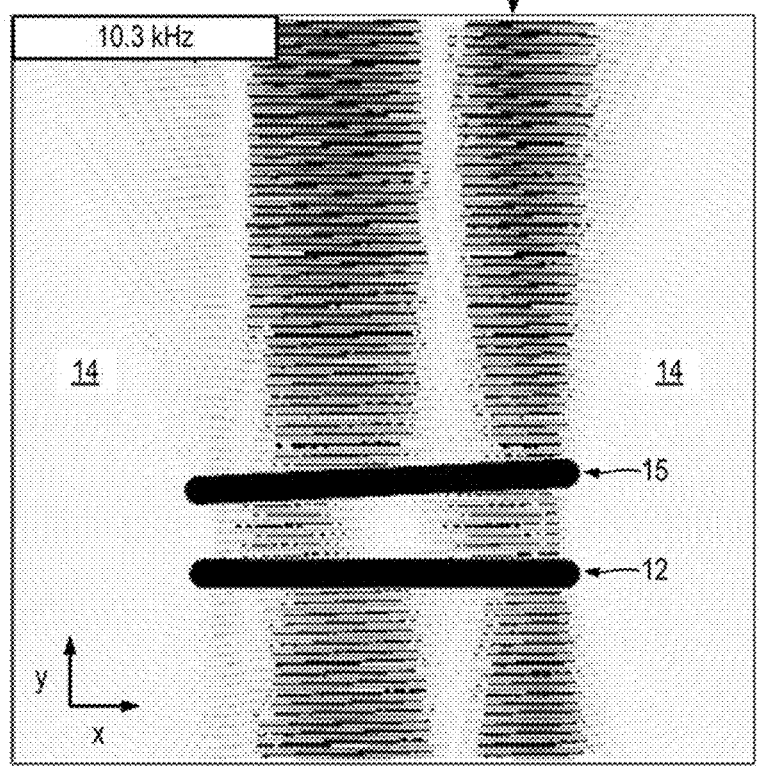
Figure 11C:
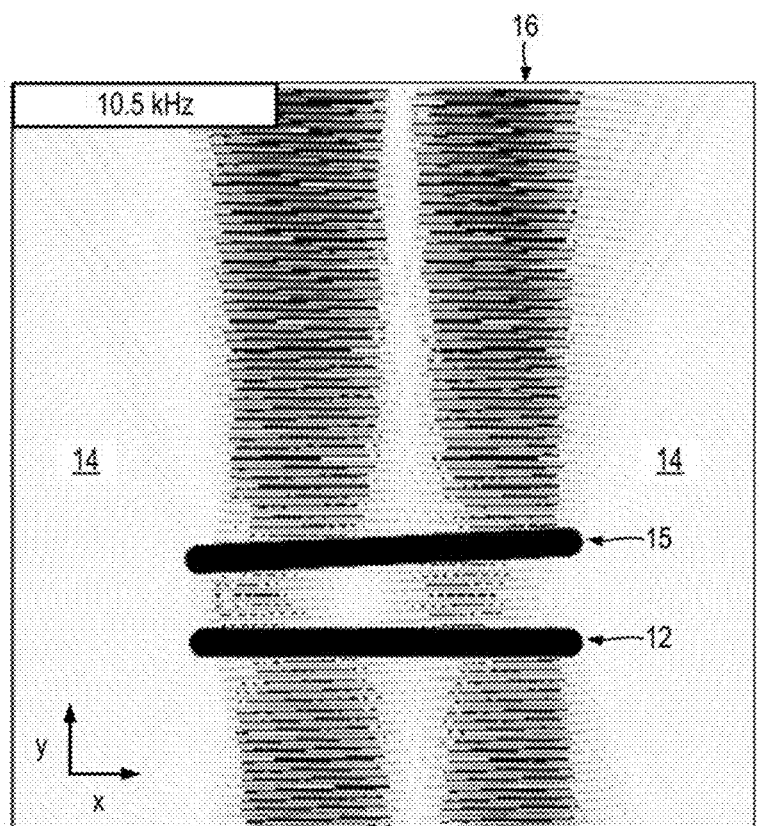
Figure 11D:
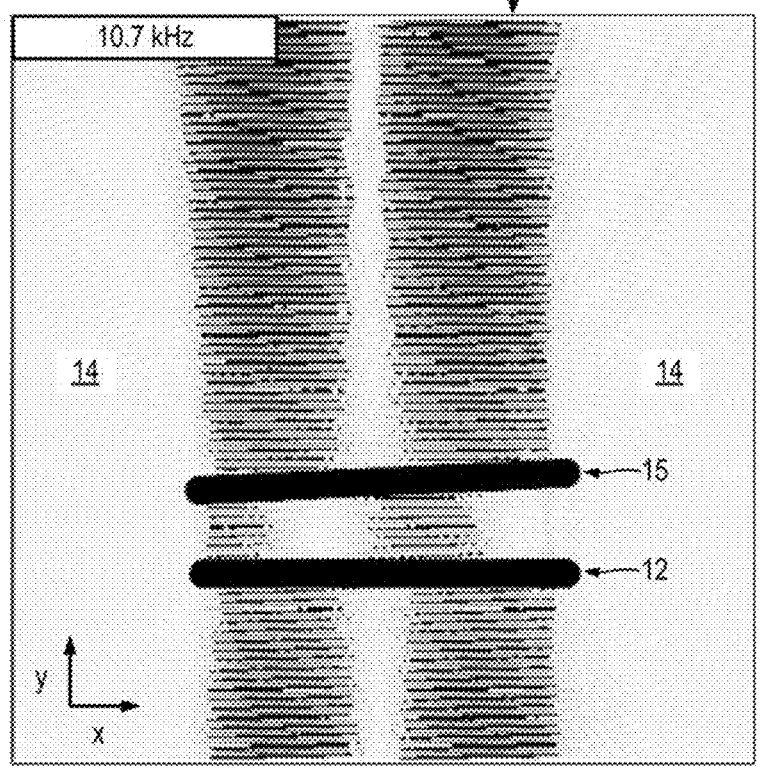
Figure 11E:
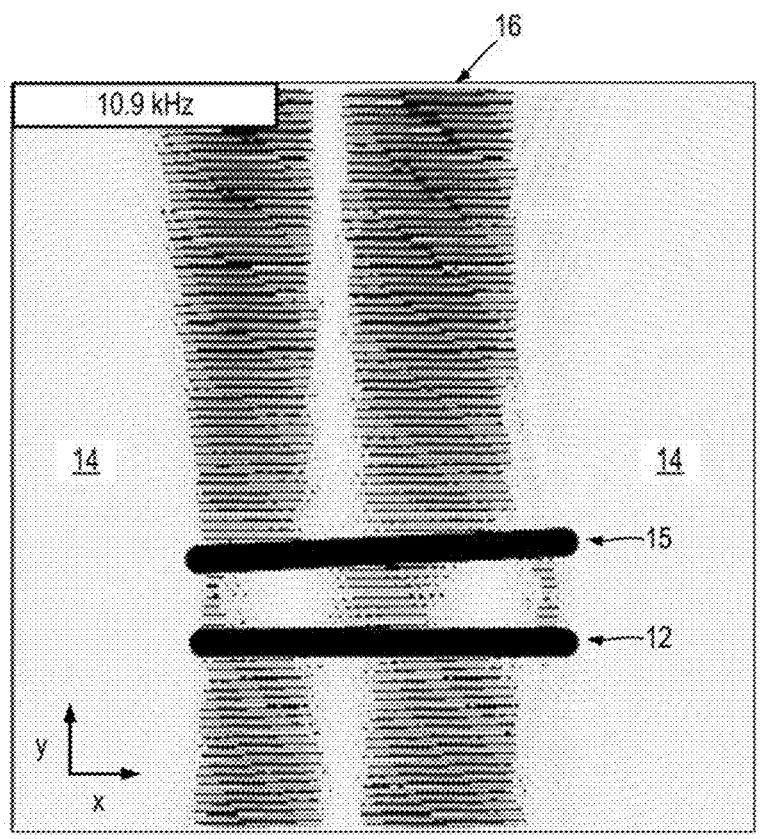
Figure 11F:
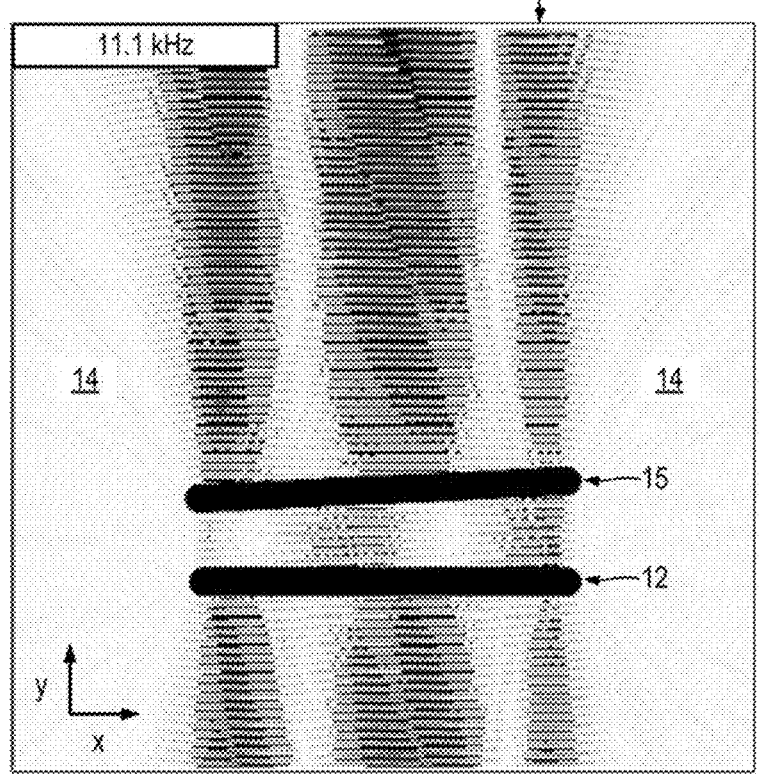

Referring also to FIG. 10, the variation of Moiré fringe 16 envelope frequency with angle θ is shown.

Variation of Moiré Fringe Pattern with Frequency:

Control over Moiré fringes 16 location and spacing may also be provided by varying the frequency of actuators at a fixed angle θ.

Referring also to FIGS. 11A to 11F, the results of simulations are shown which illustrate variations in the pattern of Moiré fringes 16 with the frequency of the first and second linear arrays 12, 15.

In FIGS. 11A to 11F, black or dark shading indicates relatively high amplitude and white or light shading indicate relatively low amplitude. The amplitudes shown in FIGS. 11A to 11F correspond to a single instant of time. The simulation results shown in FIGS. 11A to 11F were calculated in a similar way to those of FIG. 7 and FIGS. 9A to 9G. For each frequency examined, the first and second arrays 12, 15 spanned approximately the same distance in the x direction. However, because different frequencies were used, the spacing and number of actuators in the first and second arrays 12, 15 were slightly different for each frequency. For each frequency examined, the actuators were spaced apart by half the corresponding wavelength. For FIG. 11A corresponding to 10.1 kHz, there were 72 actuators in each linear array 12, 15, whereas for FIG. 11F corresponding to 11.1 kHz there were 79 actuators in each linear array 12, 15. The angle θ between the first and second arrays 12, 15 was fixed at θ=0.047124 rad (2.7 degrees).

It may be observed from FIG. 11A to FIG. 11F that as the frequency of driving the first and second arrays 12, 15 is increased, the pattern of Moiré fringes 16 translates generally in the negative x direction.

Figure 12A:
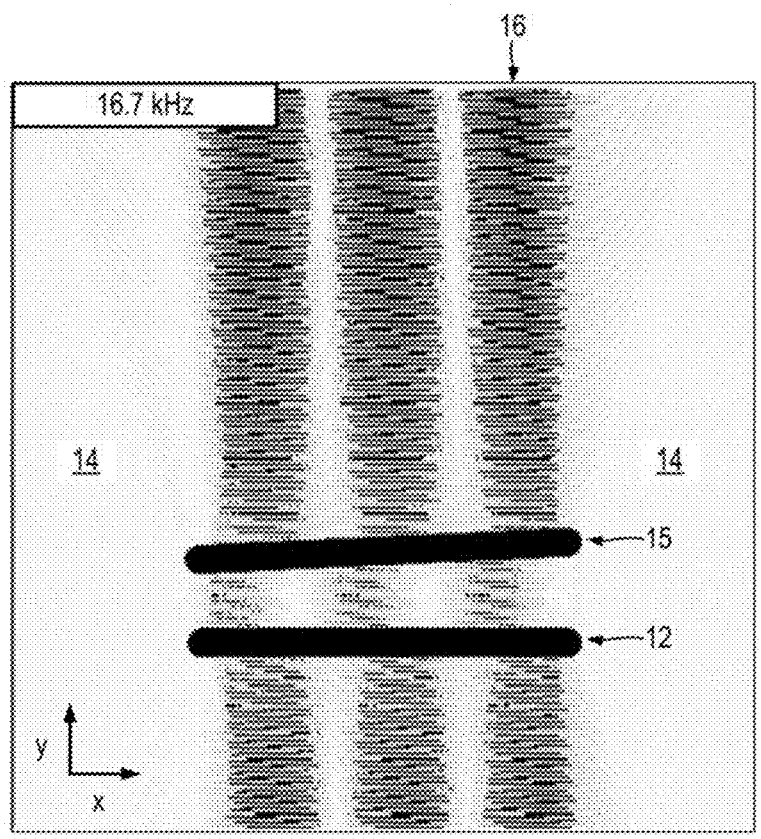
FIGS. 12A and 12B illustrate the results of simulations which show variations in a pattern of Moiré fringes with the frequency of excitation for first and second linear arrays.
Figure 12B:
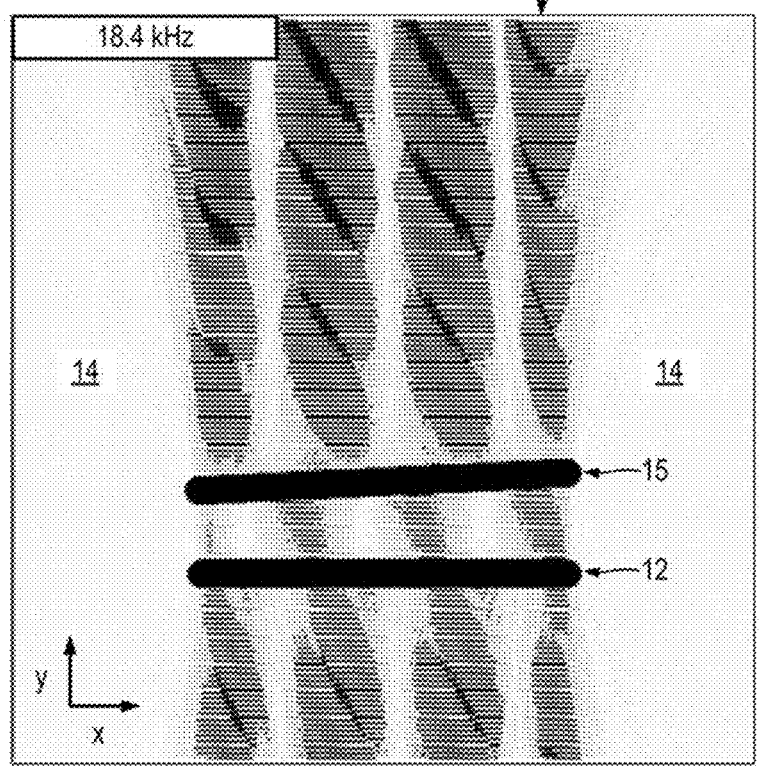

Referring also to FIGS. 12A and 12B, it is also observed that as the actuation frequency increase, the period of the Moiré fringes 16 decreases.

In this way, varying the excitation frequencies of the first and second linear arrays 12, 15 could be used to vary both the location and the spacing of Moiré fringes 16 so as to provide haptic excitations localised to specific locations of a touchscreen. Compared to varying the angle θ between first and second arrays 12, 15, varying the frequency is relatively simpler in practice because the physical arrangement of elements providing the actuators can be fixed. The precise frequencies of excitation could be varied by small amounts so as to tune the precise locations of Moiré fringes 16 to a location where a user interacts with a touchscreen device. In some examples, varying the frequency to control the location of Moiré fringes 16 could be used to track a user's digit as it moves across a touchscreen panel, providing continuously localised haptic excitations.

Combining Localisation with User Perceptibility:

Simulations shown in FIGS. 7, 9A to 9G, 11A to 11F, 12A and 12B have been performed for first and second arrays 12, 15 operating at the same frequencies for simplicity of explaining the generation of Moiré fringes 16.

In practice, single frequency excitation at relatively high frequencies may be imperceptible to a user, as described hereinbefore. A combination of beating in time and Moiré fringes 16 may be used to provide a combination of spatial localisation and user perceptibility.

For example, the first array 12 may be driven at a first frequency $f_1$ and the second array 15 at a second frequency $f_2$, wherein $f_1-f_2=f_B$, the beating frequency. This will cause the wavelengths of excitations/vibrations from the first and second arrays 12, 15 to have slightly different wavelengths, $\lambda_1=c/f_1$ and $\lambda_2=c/f_2$, in which c is the speed of sound in the touchscreen panel (likely dominated by a glass cover screen/lens). However, the first and second wavelengths $\lambda_1$, $\lambda_2$ will be similar enough to generate Moiré fringes 16, since the conditions in practice will be such that the ratio $f_1/f_B \approx f_2/f_B$ is of the order of several hundred.

Alternatively, the first and second arrays 12, 15 may be driven at the same frequency using sinusoidal signals as a carrier signal, with amplitude modulation by a lower frequency signal.

Figure 13A:
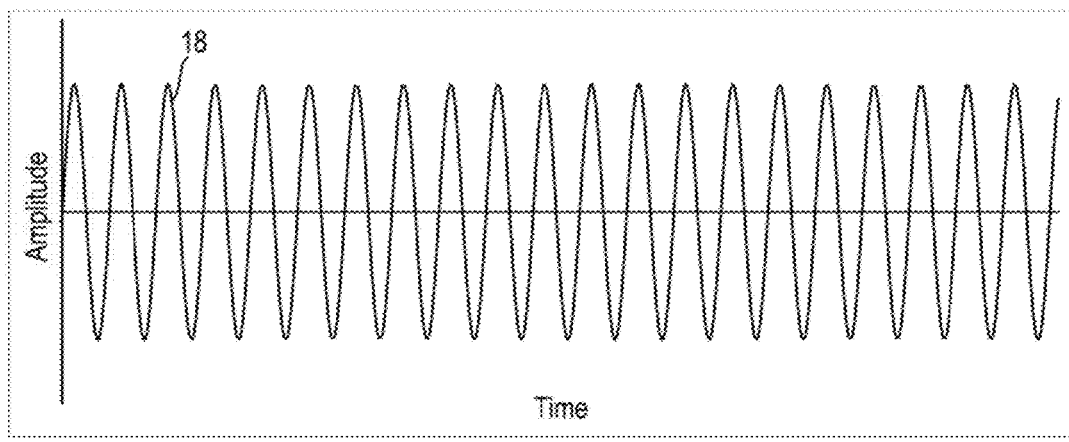
FIG. 13A illustrates a sinusoidal carrier signal.

Referring also to FIG. 13A, a sinusoidal carrier signal 18 is shown.

Figure 13B:
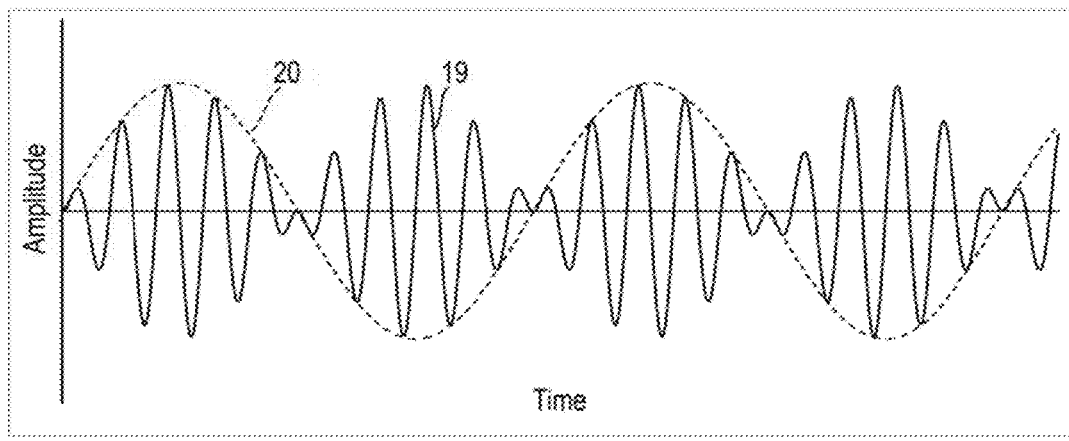
FIG. 13B illustrates a modulated carrier signal.

Referring also to FIG. 13B, a modulated carrier signal 19 is shown.

The signals driving a piezoelectric amplifier will, in general, be provided using an amplifying circuit. Such an amplifier may be readily adapted to allow amplitude modulation of the carrier signal 18 by an envelope signal 20. The envelope signal 20 may be sinusoidal with a frequency of one half the desired haptic excitation frequency. For example, if the intention is to generate 200 Hz haptic excitations, a 100 Hz envelope signal 20 may be used.

Figure 13C:
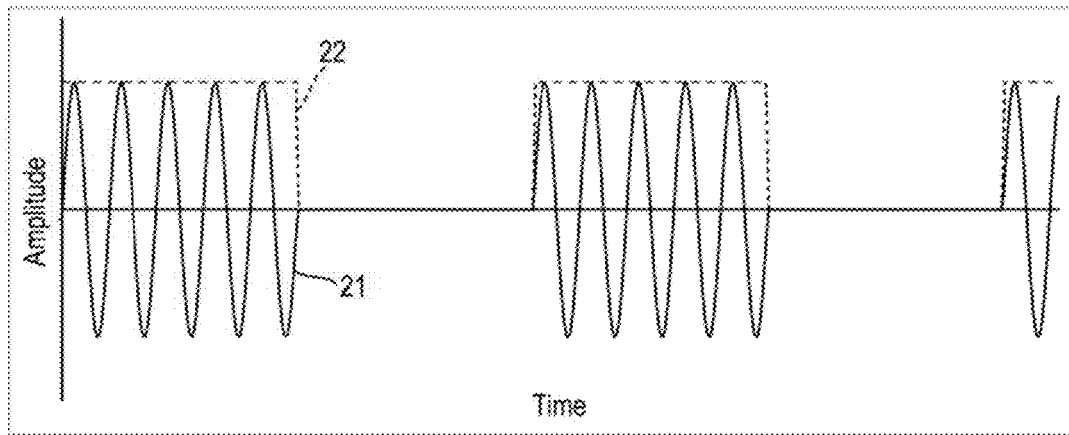
FIG. 13C illustrates a gated carrier signal.

Referring also to FIG. 13C, a gated carrier signal 21 is shown.

The gated carrier signal 21 may be generated by modulating the sinusoidal carrier signal 18 by a square wave envelope 22. The square wave envelope 22 may be generated by simply switching the output of the sinusoidal carrier signal 18 on and off. The frequency of the square wave envelope 22 may be set to enhance user perceptibility, for example, within the range from 500 Hz to 400 Hz inclusive.

Beating Signal Experiments:

Without wishing to be limited to any specifically described arrangements or components, experiments demonstrating the generation of beating signals on a touchscreen panel glass cover shall be described.

Figure 14:
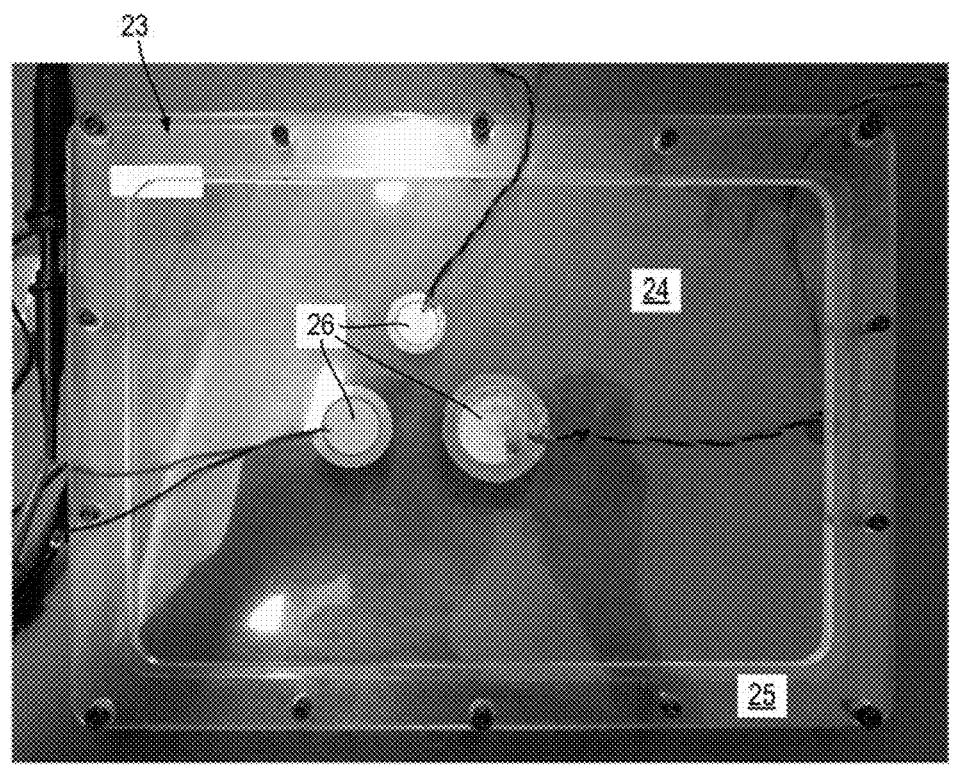
FIG. 14 is a photograph of a test rig.

Test Rig and Resonance Frequencies:

Referring also to FIG. 14, a test rig 23 used to conduct experiments is shown.

The test rig 23 includes of a tempered glass screen 24 clamped in place by a polymer frame 25 formed from Perspex®. In order to characterise the glass screen 24 and effective boundary conditions of the clamping, the resonance frequencies of the glass screen 24 were investigated using Chladni patterns. Chladni patterns were observed at frequencies of 176 Hz, 772 Hz, 1.04 kHz, 1.14 hHz and 1.49 kHz using a speaker having a frequency roll-off over 2 kHz. Higher frequency acoustic transducers/actuators, or modelling, could be used to investigate higher resonance frequencies.

For the test rig 23, ceramic piezoelectric transducers 26 were applied to the glass screen 24. A variety of piezoelectric transducers 26 were used. Multicomp® Q1Y13P ceramic piezo transducers 26 having a resonant frequency around 4.5 kHz were used to apply vibrations to the glass screen 24. In order to sense vibrations of the glass screen 24, Multicomp® MCUSD14A58S9RS-30C ceramic piezoelectric transducers 26 were used, which have a resonance frequency around 58 kHz. At frequencies below their resonant peaks, ceramic piezoelectric transducers may be used as sensors.

Figure 15:
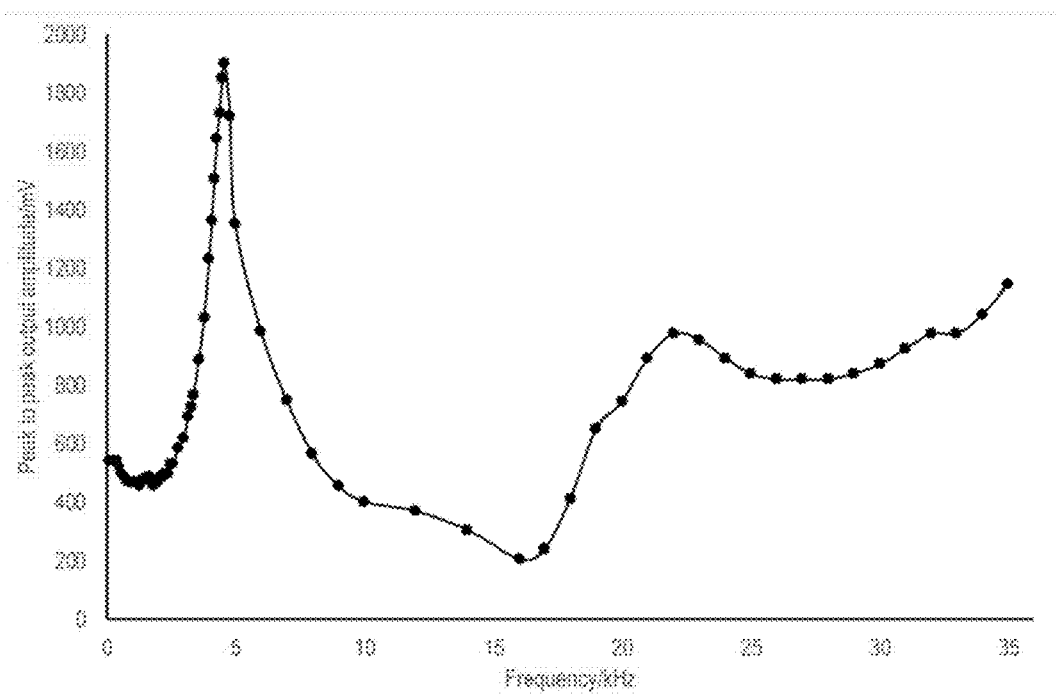
FIG. 15 is a graph showing a measured frequency response of a ceramic piezo transducer.

Referring also to FIG. 15, the frequency response of a Q1Y13P ceramic piezo transducer 26 is shown.

In order to obtain the frequency response data shown in FIG. 15, a Q1Y13P ceramic piezo transducer 26 was used as an actuator and a MCUSD14A58S9RS-30C ceramic piezoelectric transducer 26 was used as a sensor. The frequency response of the Q1Y13P ceramic piezo transducer 26 was analysed using sinewave inputs having amplitudes of 20 V peak-to-peak.

The frequency response of the Q1Y13P ceramic piezo transducer 26 includes a resonance peak around 4.5 kHz, and a second, smaller resonance peak around 22 kHz. As the 22 kHz peak is outside the typical range of human hearing, the 22 kHz peak may be considered for obtaining non audible haptic vibrations.

Figure 16:
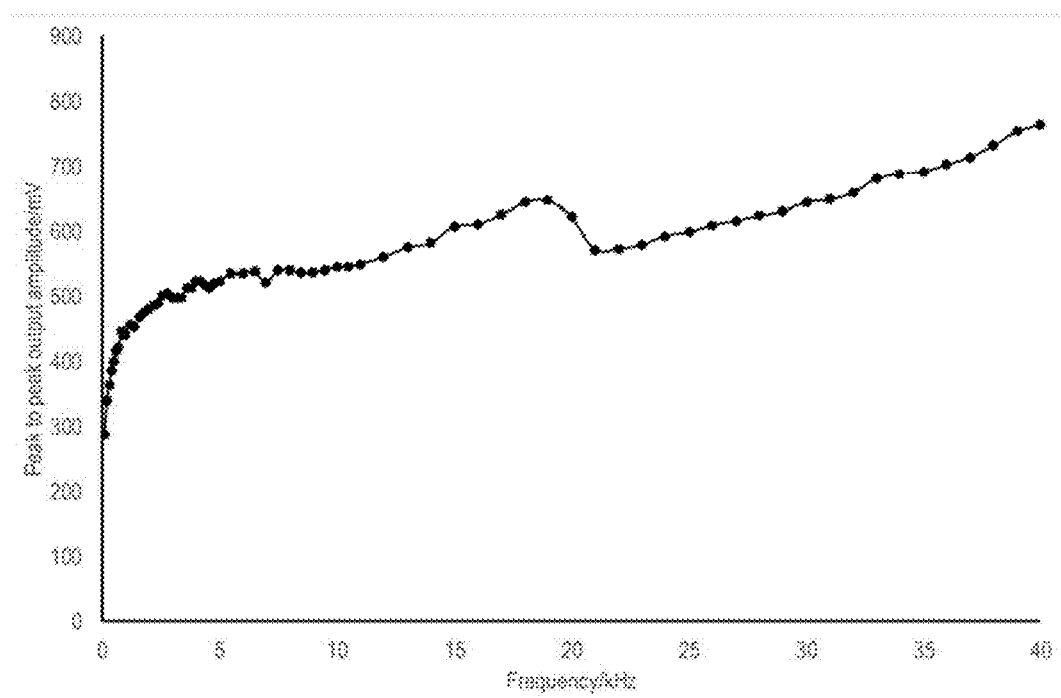
FIG. 16 is a graph showing a measured frequency response of a ceramic piezo transducer.

Referring also to FIG. 16, the frequency response of a MCUSD14A58S9RS-30C ceramic piezoelectric transducer 26 is shown.

The frequency response of the MCUSD14A58S9RS-30C ceramic piezoelectric transducer 26 was obtained by using a first MCUSD14A58S9RS-30C ceramic piezoelectric transducer 26 as an actuator, and a second MCUSD14A58S9RS-30C ceramic piezoelectric transducer 26 as a sensor. The frequency response of the MCUSD14A58S9RS-30C ceramic piezoelectric transducer 26 was analysed using sinewave inputs having amplitudes of 20 V peak-to-peak.

The frequency response of the MCUSD14A58S9RS-30C ceramic piezoelectric transducer 26 was observed to be devoid of resonance peaks within the frequency range of interest. Consequently, the MCUSD14A58S9RS-30C ceramic piezoelectric transducers 26 were suitable for use as sensors up to at least 40 kHz.

Theoretical Comparison of Ceramic Piezo Transducers and Polymer Piezoelectric Sheets:

Without wishing to be bound by theory, it shall be useful to compare the expected performance of ceramic piezo transducers 26 used in the test rig 23 and polymer piezoelectric sheets (FIG. 17) which may be included as a layer within a touchscreen panel for providing haptic vibrations.

Figure 17:
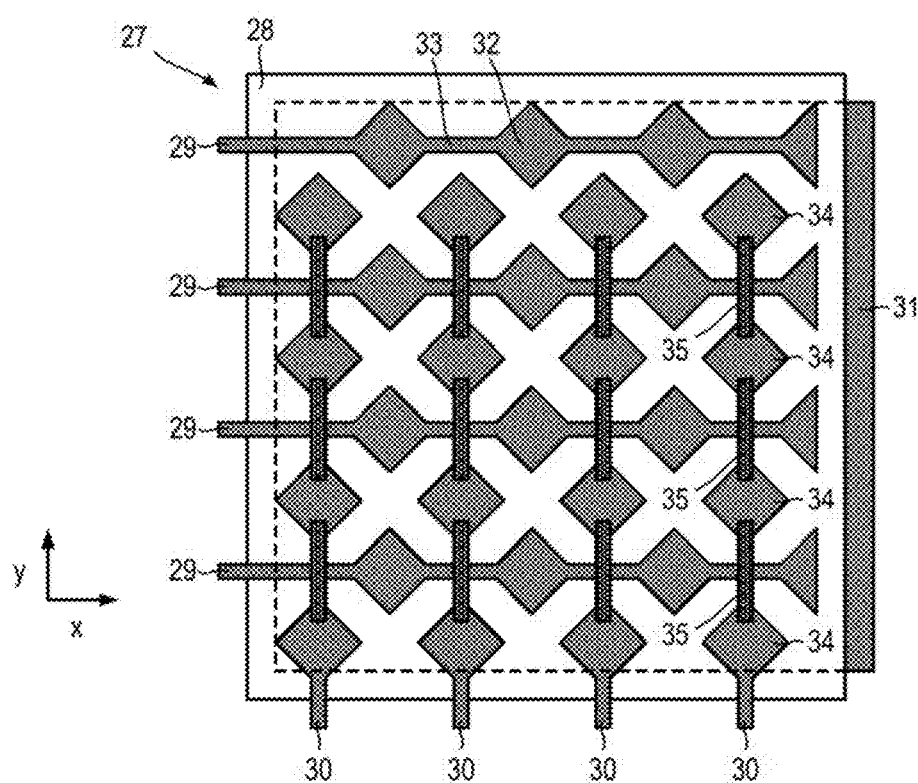
FIG. 17 illustrates a first exemplary touchscreen panel.

Referring also to FIG. 17, a first touchscreen panel 27 is shown.

The first touchscreen panel 27 includes 1 layer of piezoelectric material 28. The layer of piezoelectric material 28 may be a polymer such as polyvinylidene fluoride (PVDF). The layer of piezoelectric material 28 also provides a dielectric layer. A number of first electrodes 29 are disposed on an upper face of the layer of piezoelectric material 28. The first electrodes 29 extend in a first, x direction and are spaced apart to form an array in a second, y direction. A number of second electrodes 30 are also disposed on an upper face of the layer of piezoelectric material 28. The second electrodes 30 extend in the second, y direction and are spaced apart to form an array in the first, x direction. A common electrode 31 is disposed on the lower face of the layer of piezoelectric material 28. The common electrode 31 is un-patterned and substantially co-extensive with the first and second electrodes 29, 30.

Each first electrode 29 is a continuous conductive region extending in the first direction x. Each first electrode 29 includes several pad segments 32 evenly spaced in the first direction x and connected to one another in the first direction x by relatively narrow bridging segments 33. Each second electrode 30 comprises several pad segments 34 evenly spaced in the second direction y. The pad segments 34 of the second electrodes 30 are disposed on the upper face of the layer of piezoelectric material 28 and are interspersed with, and separated by, the first electrodes 29. The pad segments 34 corresponding to each second electrode 30 are connected together by conductive jumpers 35. The jumpers 35 each span a part of a first electrode 29 and the jumpers 35 are insulated from the first electrodes 29 by a thin layer of dielectric material (not shown) which may be localised to the areas around the intersections of each jumper 35 with the first electrodes 29.

Alternatively, a thin dielectric layer (not shown) may overlie the upper face of the layer of piezoelectric material 28, the first electrodes 29 and the pad segments 34 of the second electrodes 30. Conductive traces (not shown) extending in the second direction y may be disposed over the single thin dielectric layer (not shown), each conductive trace (not shown) overlying the pad segments 34 making up one second electrode 30. The overlying conductive traces (not shown) may connect the pad segments 34 making up each second electrode 29 using vias (not shown) formed through the single thin dielectric layer (not shown).

The first touchscreen panel 27 may be used to determine a number and corresponding locations of user interactions with the touchscreen panel 27 using conventional projected capacitive techniques. The first exemplary touchscreen panel 27 may be used to determine a number, corresponding locations and applied forces of user interactions using the apparatus and methods described in co-owned application WO 2016/102975 A2. In particular, the apparatus and methods described in connection with FIGS. 21 to 29 of WO 2016/102975 A2 from page 46, line 23 to page 54, line 28.

In addition to determining locations and/or forces of user interactions, the first and/or second electrodes 29, 30 of the first exemplary touchscreen panel 27 may also be used to generate haptic excitations to provide feedback to a user by applying an alternating voltage signal between the first and/or second electrodes 29, 30 and the common electrode 31. For example, after one or more user interactions have been detected, first and/or second electrodes which are distant from the locations of user interactions may be used to generate haptic excitations. In this way, the electrodes 29, 30 close to the user interactions may continue to be used to track user interactions with the first touch panel 27. Haptic excitations may be generated using some or all of the electrodes 29, 30. For example, if localisation is not required, then half the electrodes 29, 30 may be driven at a first frequency f1 and the remaining electrodes 29, 30 at a second frequency f2 so as to generate user perceptible haptic excitation using the beating mechanism.

In order to establish the relevance of measurements conducted using the test rig 23 to the first exemplary touchscreen panel 27, and without wishing to be bound by theory, the theoretical performance of ceramic piezo transducers 26 used in the test rig 23 and piezoelectric sheets such as the layer of piezoelectric material 28 may be compared.

In order to compare the performance of ceramic piezo transducers 26 and a layer of piezoelectric material 28, an equation for the force exerted by a piezoelectric material when excited by an electric field is needed. Such an equation may be derived under the assumption that $d_{33}$ of the piezoelectric coefficients of the piezoelectric material can be defined both as the charge formed when 1 N of force is applied or the charge needed in order to produce 1 N of force. From the equations for a parallel plate capacitor:

$$C = \frac{\varepsilon A}{t}$$

in which C is the capacitance, $\varepsilon$ is permittivity of material between the plates of the parallel plate capacitor, A is the overlapping area of the plates and t is the separation of the plates.

Since charge, Q=CV, with V the voltage between the plates, the equation above may be rewritten as:

$$Q = \frac{\varepsilon A V}{t}$$

If the piezoelectric layer 28 extends in the x-y plane, then for actuation by the first and/or second electrodes 29, 30, the relevant piezoelectric coefficient is that relating charge generated to a normal force applied in the z direction, namely:

$$d_{33} = \frac{Q}{F}$$

In which $d_{33}$ is the relevant piezoelectric coefficient and F is a force applied in the z direction to an x-y plane normal to the z direction. Substituting the equation for $d_{33}$ above into the equation for Q:

$$F = \frac{\varepsilon_0 \varepsilon_r A}{t d_{33}} V$$

In which the permittivity $\varepsilon$ has also been substituted for the product of the vacuum permittivity $\varepsilon_o$ and the relative permittivity $\varepsilon_r$ of the material between the plates of a parallel plate capacitor. Equation (5) approximates the force generated by a piezoelectric actuator as a function of input voltage. The area A is the effective area of overlap between electrodes of the piezoelectric transducer 26 and t is the thickness of the ceramic or the layer of piezoelectric material 28.

Calculations are conducted to compare a ceramic piezoelectric transducer 26 with a PVDF layer. The ratio of forces shall be considered for equal voltage V inputs:

$$\frac{F^{PVDF}}{F^C} = \frac{\varepsilon_r^{PVDF} A^{PVDF} t^C d_{33}^C}{\varepsilon_r^C A^C t^{PVDF} d_{33}^{PVDF}}$$

In which superscript "PVDF" refers to values for a layer of piezoelectric material 28 in the form of PVDF and the superscript "C" relates to values for a ceramic piezoelectric transducer 26. For example, $F^{PVFD}$ is the force generated by a layer of PVDF and $F^C$ is the force generated by a piezoelectric transducer 26.

In the case where the area and thickness of PVDF and ceramic are equal, the equation above evaluates to $P^{PVFD}=0.152 F^C$ using values of $\varepsilon_r^{PVFD}=11$, $d_{33}^{PVFD}=15\times 10^{-12}$ C·N$^{-1}$, $\varepsilon_r^C=2800$ and $d_{33}^C=578\times 10^{-12}$ C·N$^{-1}$. Consequently, for the same area and thickness, the performance of a layer of PVDF cannot match that of a ceramic piezoelectric transducer 26.

However, a layer of PVDF may be thinner than some ceramics used for ceramic piezoelectric transducers 26. For example, PVDF layers having $t^{PVFD}=40\times 10^{-6}$ m (40 μm) are available, which compares to $t^C=2\times 10^{-3}$ m (2 mm) for the ceramic piezoelectric transducers 26 applied to the test rig 23. With these thickness values and assuming equal areas, Equation (6) evaluates to $F^{PVFD}=7.6F^C$. Moreover, in the first touchscreen panel 27, depending on the number of electrodes 29, 30 used, the effective area $A^{PVFD}$ can be made relatively larger than that of a discrete ceramic piezoelectric transducer 26.

Therefore, based on the theoretical estimates, the force output of a PVDF layer can be made comparable, or at least of the same order of magnitude, to that of a ceramic piezoelectric transducer 26 by adjusting the overall area of electrodes 29, 30, 31 and the thickness of the layer of piezoelectric material 28.

Figure 18:
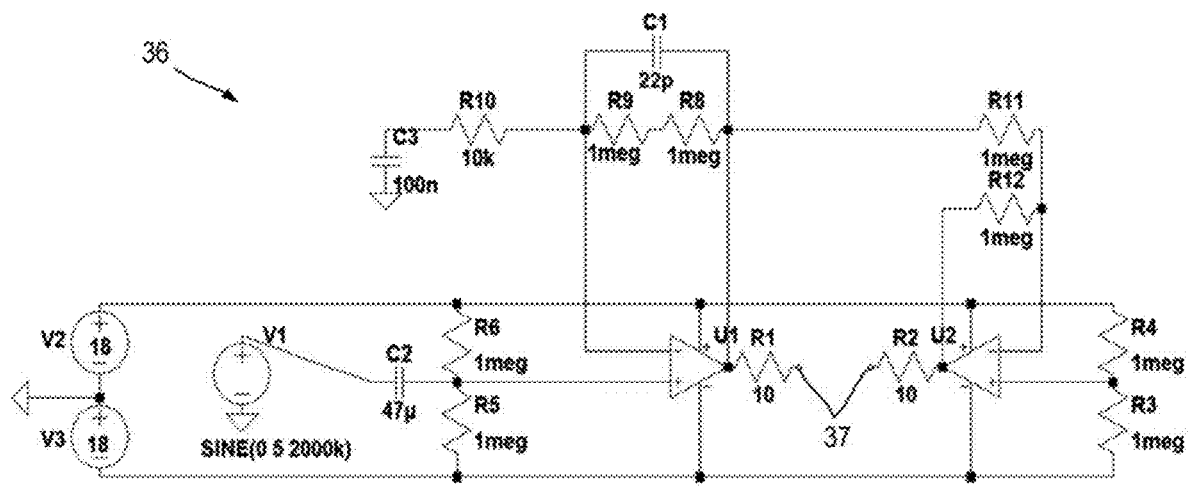
FIG. 18 is a circuit diagram of a bridge tied load circuit for driving piezoelectric actuators.

Driving Piezoelectric Transducers:

Referring also to FIG. 18, a bridge tied load circuit 36 is shown.

In order to provide sufficient amplitude of haptic excitations, the input voltage signals for the actuators should be amplified. The bridge tied load circuit 36 may be used for this purpose. Suitable op-amps for the bridge tied load circuit 36 include TLo84 op-amps from Texas Instruments®.

The load, i.e. a piezoelectric actuator, is connected between output terminals 37. In this way, a piezoelectric actuator is connected between inverting and non-inverting amplifiers providing essentially the same input voltage. As a consequence, the voltage swing across the piezoelectric actuator can be double the voltage from each individual amplifier.

As described hereinbefore, the bridge tied load circuit 36 may additionally or alternatively be modified to permit amplitude modulation (see FIG. 13B) or gating of a carrier signal (see FIG. 13C).

In alternative examples, the amplitude of excitation generated using piezoelectric actuators may be increased by arranging a pair of piezoelectric actuators on opposed sides of glass screen 24. By driving the pair of piezoelectric actuators in antiphase, the excitation amplitude can be effectively doubled.

Experimental Verification of Beating Patterns:

Using the test rig 23 and bridge tied load circuit 36, beating patterns having carrier frequencies of 2 kHz and 4.6 kHz and envelope frequencies at 200 Hz were generated on the glass screen 24 and measured using a ceramic piezoelectric transducer 26 configured as a sensor.

Figure 19:
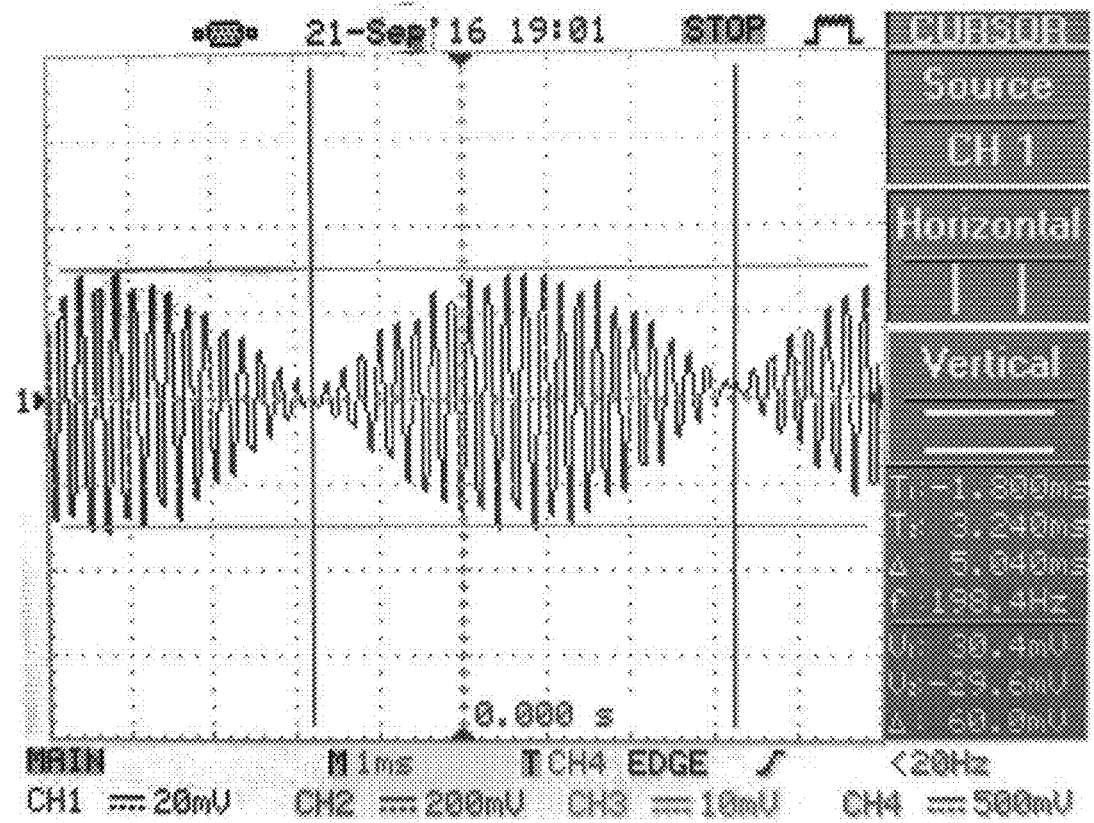
FIG. 19 is a screen capture of an oscilloscope illustrating modulation of a carrier signal.

Referring also to FIG. 19, a screen capture of an oscilloscope is shown for a carrier signal frequency of 4.6 kHz.

The screen capture shown in FIG. 19 corresponds to the signal measured by a ceramic piezoelectric transducer 26 configured as a sensor. Both the carrier signal 3 and the envelope 4 may be observed. For carrier frequencies at both 2 kHz and 4.6 kHz, the 200 Hz envelope of the vibration could be clearly felt by touching the glass screen 24.

Alternative Method of Generating Haptic Vibrations Using Beating:

An alternative method of using beating to provide haptic vibrations involves combining first and second frequencies $f_1$, $f_2$ which add up to 200 Hz. Following Equation 1, it is possible to obtain a carrier signal at $(f_1+f_2)/2=200$ Hz which is modulated by an envelope of lower frequency $(f_1-f_2)/2$.

Figure 20:
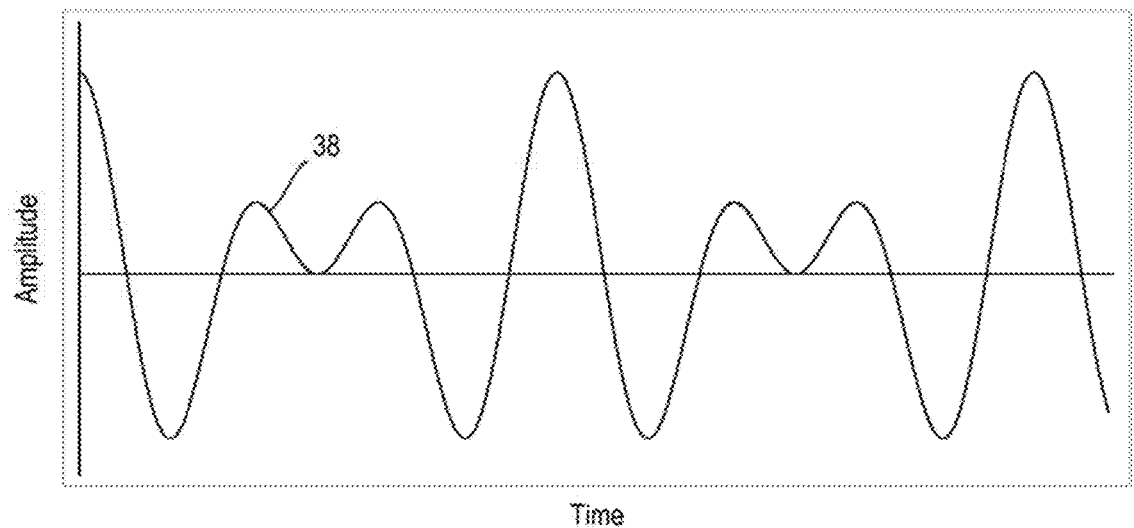
FIG. 20 illustrates a simulation of generating haptic vibrations by combining first and second frequency signals additively.

Referring also to FIG. 20, a simulation of a modulated signal 38 combining first and second frequencies $f_1$, $f_2$ which add up to generate a beating frequency $f_B$ is shown.

When excitations/vibrations corresponding to the modulated signal 38 are applied to the glass screen 24, an interesting "knocking" effect takes place. Short bursts of excitation give the impression of a rapid knocking on the glass. Because the frequency of the individual knocks can be readily varied by varying the input frequencies, such a knocking method could be useful for a number of applications. For example, in order to provide continuous haptic feedback of the force applied by a user, an increased frequency of knocks may be used to indicate a greater applied force.

Non-Audible Haptic Vibrations:

The experiments conducted using the test rig used frequencies of 4.6 kHz and below. Such frequencies are within the typical frequency range for human hearing. In order to generate haptic excitations which are inaudible to a user, higher frequencies must be used, typically in excess of 20-22 kHz depending on the individual user and in particular the age of the user. The bridge tied circuit 36 is unsuitable for driving piezoelectric actuators at higher frequencies.

Figure 21:
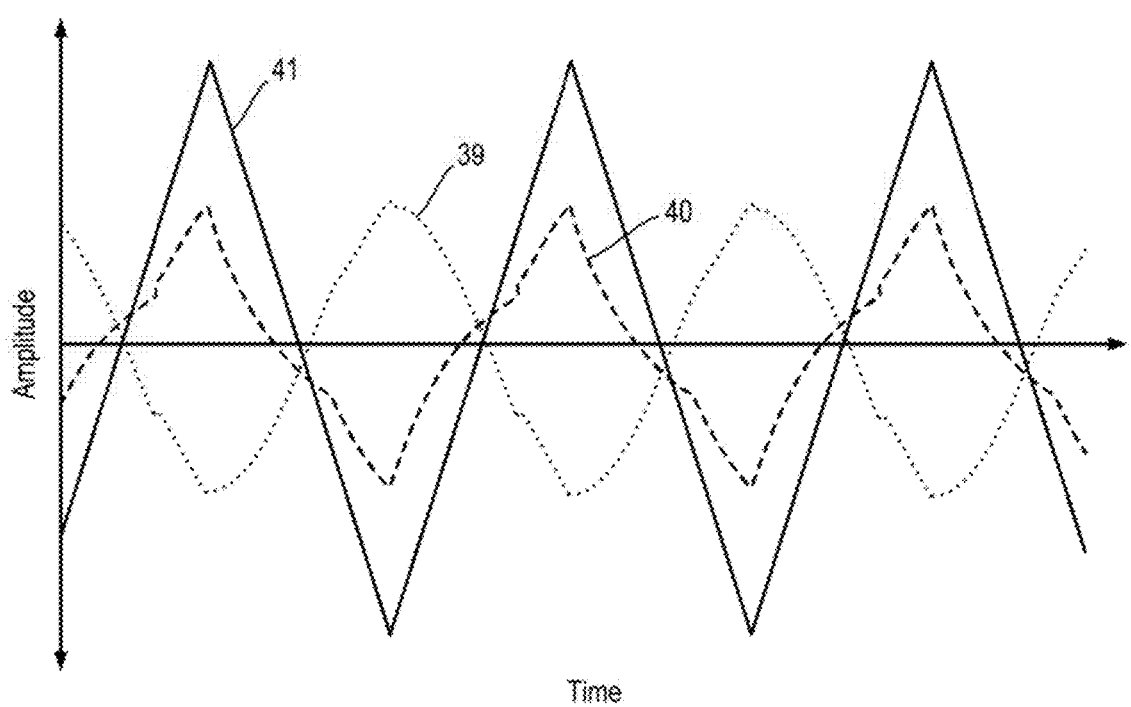
FIG. 21 illustrates the output of the circuit shown in FIG. 18 at high excitation frequency.

Referring also to FIG. 21, the output 39 of the first amplifier, the output 40 of the second amplifier, and the overall output 41 of the bridge tied load circuit 36 are shown for a frequency in excess of 20 kHz.

It may be observed that, for higher frequencies, the output of the bridge tied load circuit 36 is distorted from the intended sinusoidal signal. This distortion arises from the capacitance of a piezoelectric actuator, i.e. the load. The problem of signal distortion may be solved by using a driving circuit capable of providing larger currents.

Second Bridge Tied Load Circuit:

The current output may be increased by redesigning the bridge tied load circuit such that it includes a buffer stage which can provide more current into a capacitive load.

Figure 22:
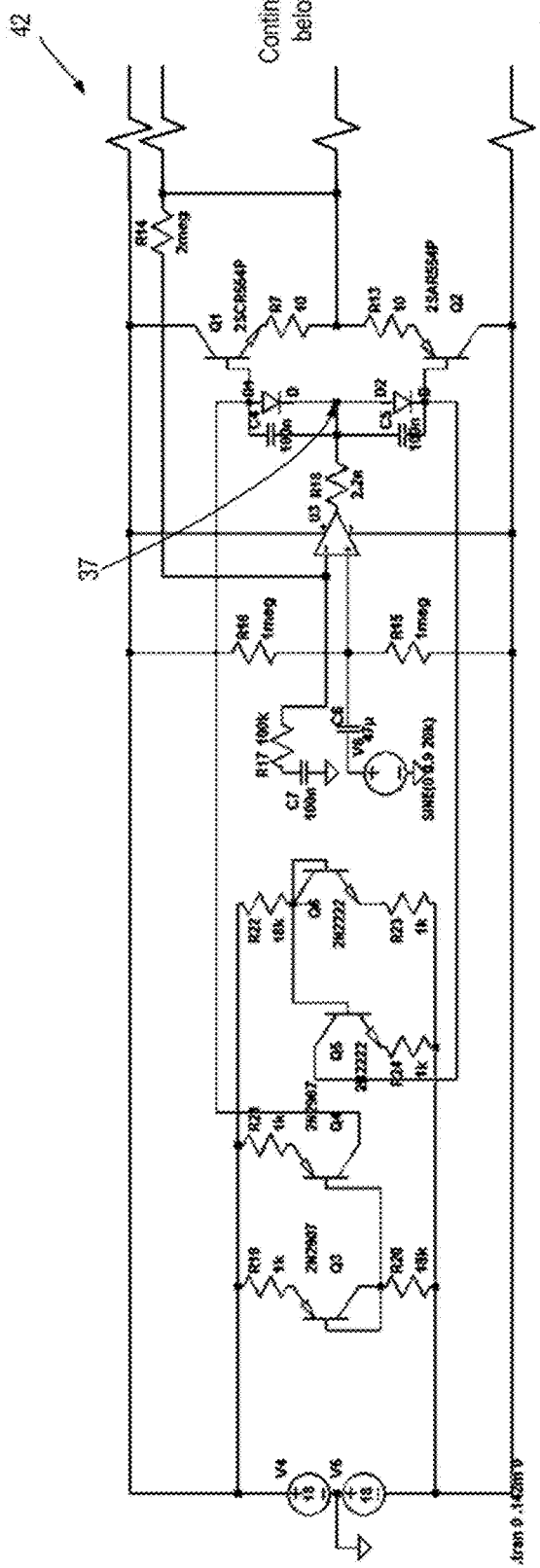
FIG. 22 is a circuit diagram of a second bridge tied load circuit for driving piezoelectric actuators at high frequencies.
Figure 22:
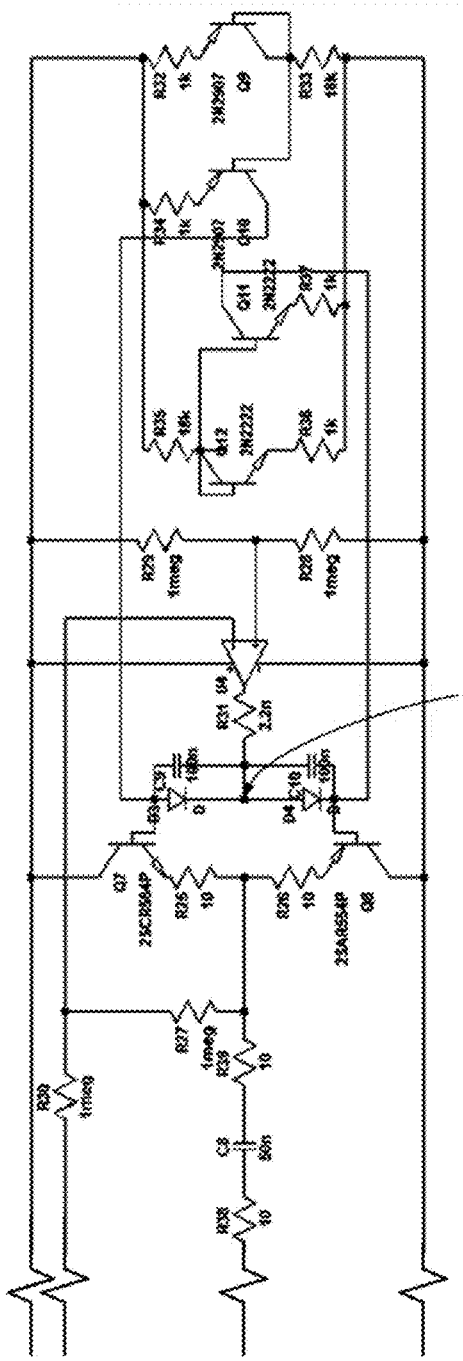

Referring also to FIG. 22, a second bridge tied load circuit 42 is shown.

In order to buffer the second bridge tied load circuit 42 a class AB amplifier is employed. The current source is made using a current source and sink based on current mirrors. By taking the feedback from the buffered output it may be ensured that the voltage gain of slightly less than 1 of the class AB amplifier does not affect the overall gain of the op-amps providing output to the output terminals 37.

The second bridge tied load circuit 42 may be used to drive piezoelectric actuators at frequencies in excess of 23 kHz as a result of the buffer stage. This allows for output of smooth sinusoidal waves to drive piezoelectric actuators, even at relatively high (non-audible) frequencies. As described hereinbefore, the greater the frequency, the greater the potential for localising haptic excitations due to the shorter wavelengths of vibrations.

Figure 23:
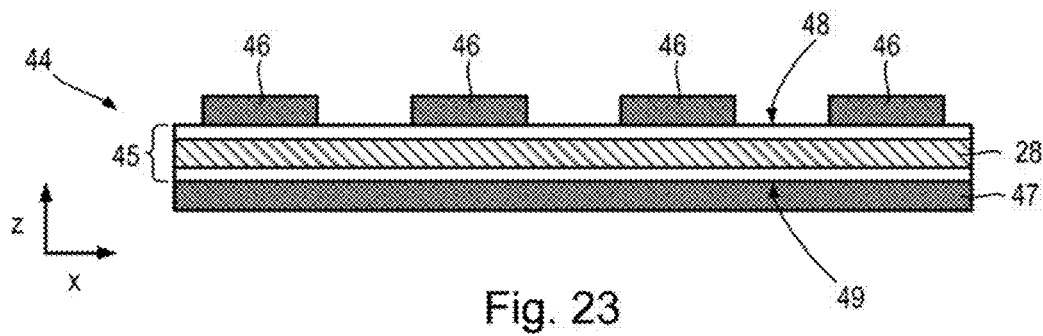
FIG. 23 is cross-section of a second touchscreen panel.
Figure 24:
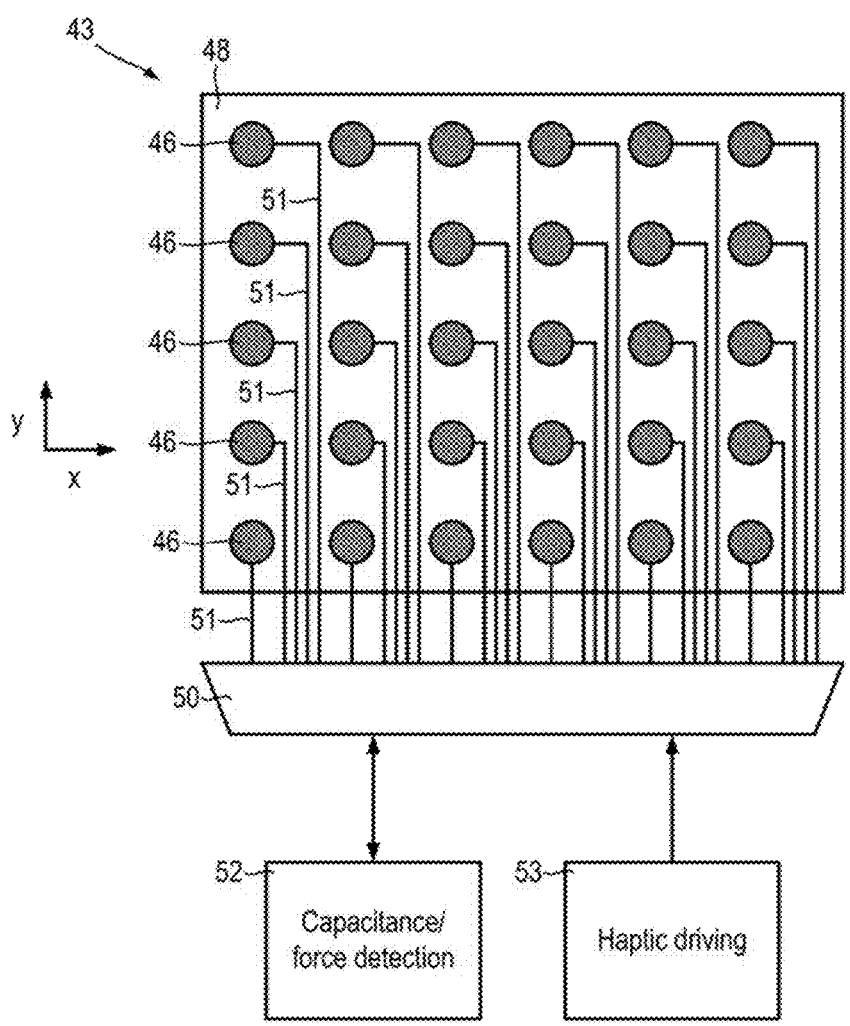
FIG. 24 illustrates a first integrated haptic system.

First Integrated Haptic System:

Referring also to FIGS. 23 and 24, a first integrated haptic system 43 is shown.

Referring in particular to FIG. 23, the first integrated haptic system 43 includes a second touch panel 44.

The second touch panel 44 includes a first layer structure 45, sensing/excitation electrodes 46 and a common electrode 47

The first layer structure 45 has a first face 48 and a second, opposite, face 49. The first layer structure 45 includes one or more layers, including at least a layer of piezoelectric material 28. Each layer included in the first layer structure 45 is generally planar and extends in first and second directions x, y which are perpendicular to a thickness direction z. The one or more layers of the first layer structure 45 are arranged between the first and second faces 48, 49 such that the thickness direction z of each layer of the first layer structure 45 is perpendicular to the first and second faces 48, 49. The sensing/excitation electrodes 46 are disposed on the first face 48 of the first layer structure 45, and the common electrode 47 is disposed on the second face 49 of the first layer structure 45.

The layer of piezoelectric material 28 may be formed from a piezoelectric polymer, for example a suitable fluoropolymer such as polyvinylidene fluoride (PVDF). The sensing/excitation electrodes 46 may be formed using indium tin oxide (ITO) or indium zinc oxide (IZO). The common electrode 47 may be formed from indium tin oxide (ITO) or indium zinc oxide (IZO).

The first layer structure 45 may include only the layer of piezoelectric material 28, such that the first and second opposite faces 48, 49 are faces of the piezoelectric material layer 28. Alternatively, the first layer structure 45 may include one or more dielectric layers which are stacked between the layer of piezoelectric material 28 and the first face 48 of the first layer structure 45. Additionally or alternatively, the first layer structure 34 may include one or more dielectric layers stacked between the second face 49 of the first layer structure 45 and the layer of piezoelectric material 28.

Any additional dielectric layer or layers included in the first layer structure 45 may be formed from a polymer dielectric material such as polyethylene terephthalate (PET), or from layers of pressure sensitive adhesive (PSA) material.

The first integrated haptic system 43 is not limited to the described structure of the second touch panel 44, and the first integrated haptic system 43 may be used in conjunction with any projected capacitance touch panel which includes a layer of piezoelectric material disposed between a number of sensing/excitation electrodes 46 and a common electrode 47.

Referring in particular to FIG. 24, the sensing/excitation electrodes 46 are disposed on the first face 48 of the first layer structure 45 and each sensing/excitation electrode 46 may take the form of a circular conductive pad. Other shapes of sensing/excitation electrode may be used such as, for example, squares or other polygonal shapes. Each sensing/excitation electrode 46 is connected to a switching circuit 50 by a corresponding conductive trace 51. The common electrode 47 is connected to a common mode voltage of the first integrated haptic system 43.

The switching circuit 50 allows each sensing/excitation electrode 46 to be connected to a capacitance/force detection module 52 or a haptic driving module 53. Any number of sensing/excitation electrodes 46 may be connected to the capacitance/force detection module 52 at any time and any number of sensing/excitation electrodes 46 may be connected to the haptic driving module 53 at any time. In general, a sensing/excitation electrode 46 is not connected to the capacitance/force detection module 52 and the haptic driving module 53 at the same time.

The capacitance/force detection module 52 measures a self-capacitance of a sensing/excitation electrode 46 to which it is connected and/or a force applied proximate to that sensing/excitation electrode 46. Examples of apparatus suitable for providing the capacitance/force detection module 52 of the first integrated haptic system 43 have been described in WO 2016/102975 A2, in particular, the examples described with reference to FIG. 15 to 20 of WO 2016/102975 A2 from page 40, line 33 to page 46, line 21. The capacitance/force detection module 52 does not need to measure forces, in which case the capacitance/force detection module 52 may be provided by any suitable projected capacitance controller.

The haptic driving module 53 includes an amplifier circuit, for example, the second bridge tied load circuit 42. Further features and functionality of the haptic driving module 52 shall be described hereinafter.

Figure 25:
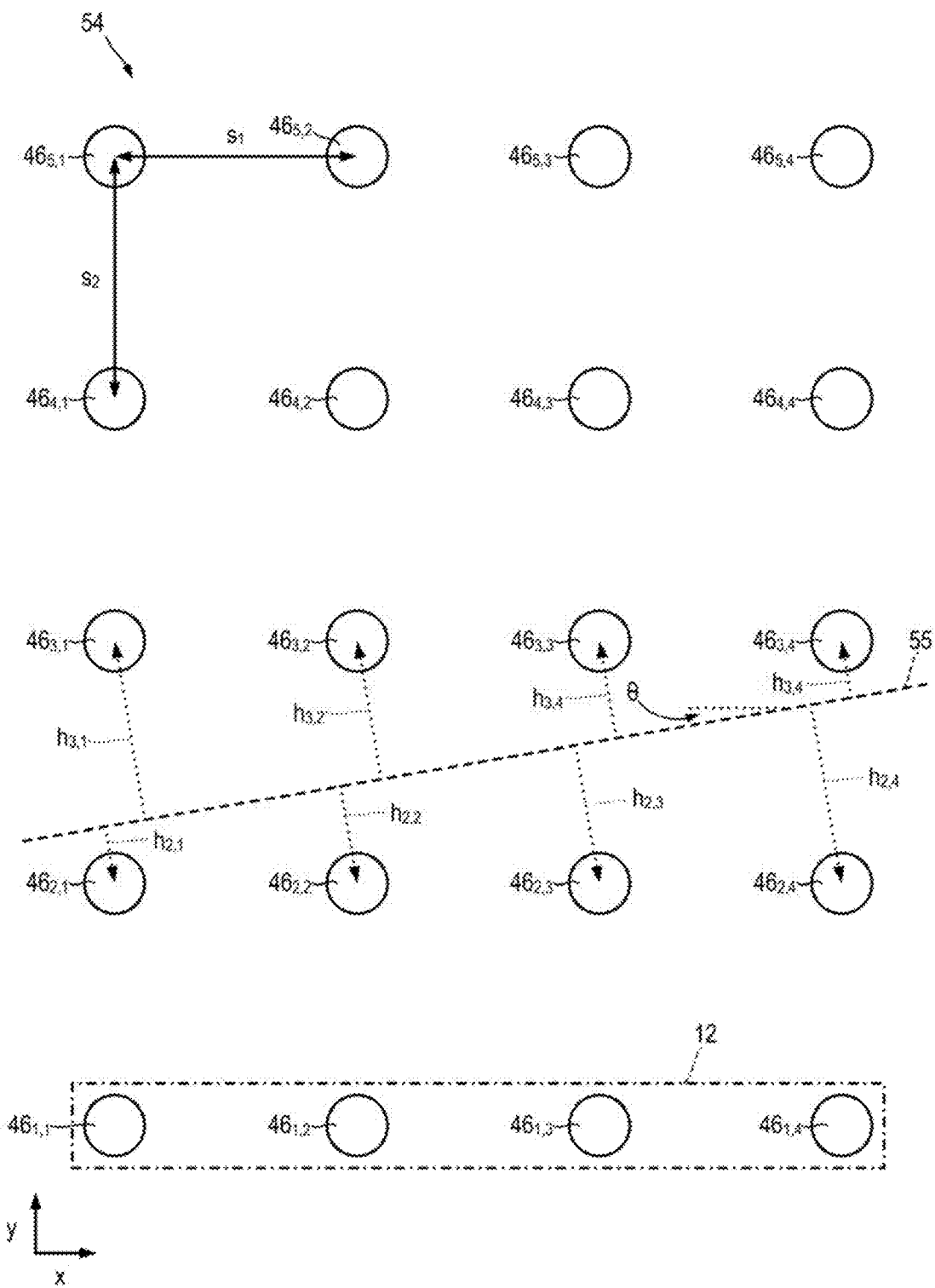
FIG. 25 illustrates a first method of generating haptic vibrations using the first integrated haptic system shown in FIG. 24.

Localisation of Haptic Excitations in the First Integrated Haptic System:

Referring also to FIG. 25, an array 54 of sensing/excitation electrodes is shown.

The array 54 is formed based on a regular grid having a first spacing $s_1$ in a first direction x and a second spacing $s_2$ in a second direction y. The first and second spacing $s_1$, $s_2$ may be equal, but are not required to be equal. Sensing/excitation electrodes 46 are arranged at the intersections of the grid, forming rows and columns of the array 54. A sensing/excitation electrode 46 belonging to the $i^{th}$ row and $j^{th}$ column of array 54 may be denoted $46_{i,j}$.

In order to generate Moiré fringes 16, two lines of actuators inclined at an angle θ are needed. Providing a first line of actuators is straightforward—the electrodes $46_{i,j}$ belonging to a row (or column) of the array 54 may provide a first linear array of actuators 12. For example, the first row electrodes $46_{1,j}$ may provide the first array of actuators 12.

A second linear array of actuators 15 inclined an angle θ may be simulated using a further row (or column) of electrodes $46_{i,j}$ and by additionally applying a phase shift to the driving signal for each electrode $46_{i,j}$. For example, the second row of electrodes $46_{2,j}$ may be used to simulate the second linear array of actuators 15. A virtual line 55 corresponds to the second linear array of actuators 15 and is inclined at an angle θ to the first direction x, i.e. at an angle θ to the first row $46_{1,j}$ providing the first linear array of actuators 12. Each electrodes $46_{2,j}$ belonging to the second row is separated from the virtual line by a corresponding perpendicular distance $h_{2,j}$. The perpendicular distances $h_{2,j}$ may be readily determined based on the desired angle θ. Then, an individual phase shift $\varphi_{2,j}$ corresponding to each electrode 46 may be calculated as $\varphi_{2,j}=k \cdot h_{2,j}$, in which $k=\omega/c$ is the wavevector of an excitation/vibration having angular frequency ω and propagating at speed c across the touchscreen panel. The second linear array of actuators 15 inclined at an angle θ may then be simulated by driving each electrode $46_{2,j}$ belonging to the second row with an additional phase shift $\varphi_{2,j}$.

The quality of the simulated second linear array of actuators 15 may be improved if an additional row (or column) of electrodes 46 is used to bracket the location of the virtual line 55. For example, by additionally driving the third row of electrodes $46_{3,j}$ with additional phase shifts as $\varphi_{3,j}=k \cdot h_{3,j}$.

In this way, Moiré fringes 16 may be generated as described hereinbefore between the excitations/vibrations originating from the first linear array 12 and the excitations/vibrations having an implied origin along the virtual line 55.

As described hereinbefore, user perceptibility may be provided by using first and second frequencies $f_1$, $f_2$ which differ by a beating frequency $f_B$. For example, the first row of electrodes $46_{1,j}$ may be driven at the first frequency $f_1$ and the second row of electrodes $46_{2,j}$ (and optionally the third row $46_{3,j}$) may be driven at the second frequency $f_2$.

Alternatively, all the electrodes $46_{i,j}$ in use, for example the first and second rows $46_{1,j}$, $46_{2,j}$ (and optionally the third row $46_{3,j}$) may be driven using the same carrier signal (without phase shifts as appropriate) which is modulated (FIG. 13B) or gated (FIG. 13C) to provide low frequency user perceptibility.

The example of the first, second and optionally third rows is provided for illustrative purposes only, and in practice any set of two or more rows or two or more columns may be used to generate Moiré fringes 16 using this method. The rows or columns selected need not be adjacent in the array 54.

In use, the capacitance/force detection module 52 measures the locations of one of more touch events corresponding to a user interacting with the second touchscreen panel 44. If haptic excitations are to be generated, the haptic driving module 53 will select first and second sets of electrodes $46_{i,j}$ which are located away from the location of the active touch events. The first and second sets of electrodes $46_{i,j}$, i.e. first and second rows or columns, may be used to generate localised haptic excitations at the locations of the active touch events, for example to generate Moiré fringes 16 having peaks coincident with the location of a touch event. The electrodes $46_{i,j}$ closer to the touch events may be concurrently used to track the touch events.

The haptic driving module selects the frequencies used and the angle θ of the virtual line 55 to tune the period of the Moiré fringes 16 to correspond to the locations of touch events (see FIGS. 9A to 9G, 11A to 11F, 12A and 12B). As touch events move across the second touchscreen panel 44, the haptic driving module 53 may track the touch event by adjusting the frequencies and/or the angle of the virtual line 55. If a touch event moves a large enough distance, the haptic driving module 53 may determine new first and second sets of electrodes $46_{i,j}$ to allow continuous tracking of the touch event by the capacitance/force detection module 52.

Alternative Method in the First Integrated Haptic System:

Instead of using the virtual line 55 method, the sensing/excitation electrodes $46_{i,j}$ may instead be slightly offset from a regular grid.

Figure 26:
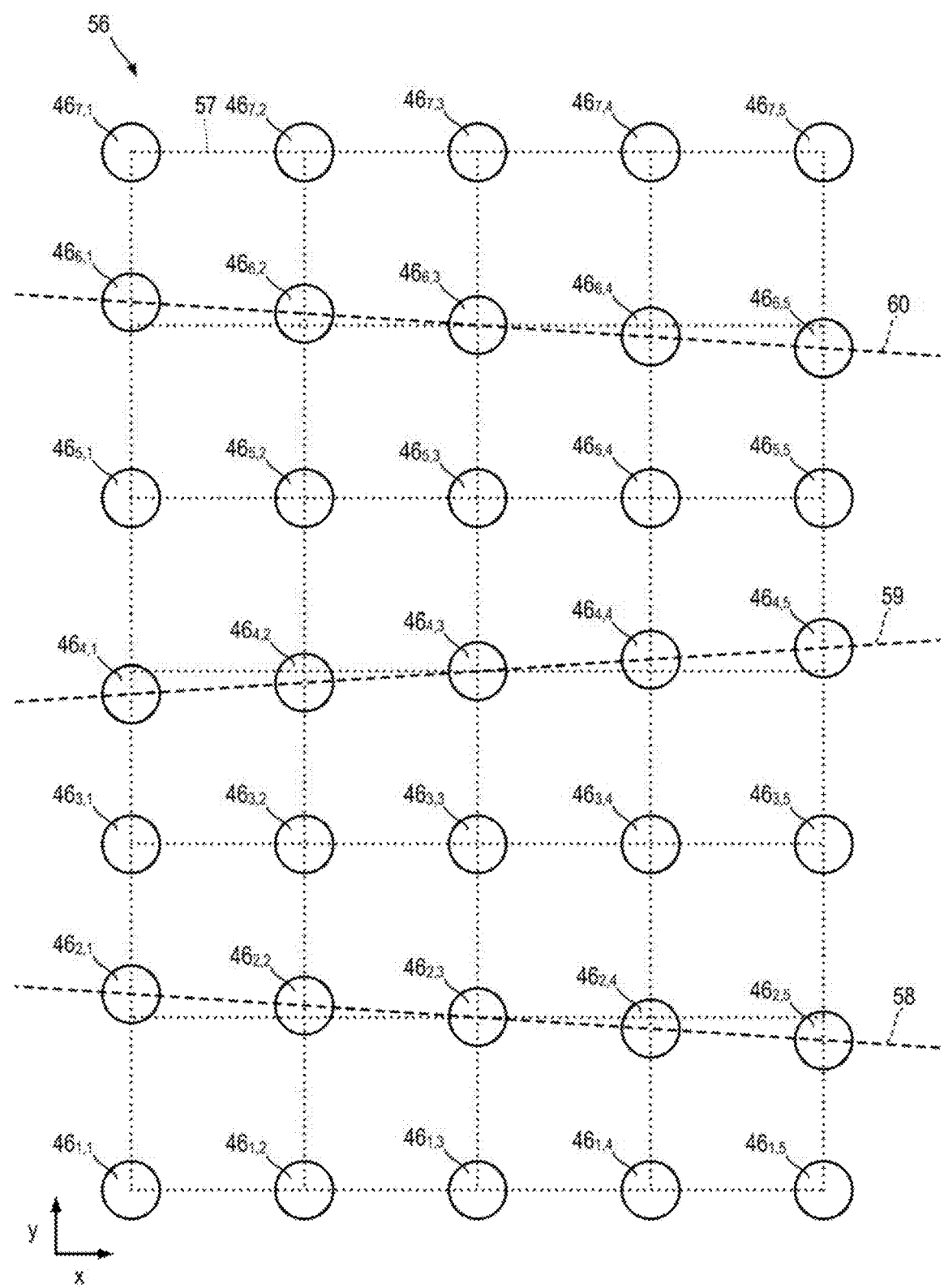
FIG. 26 illustrates an alternative configuration of the second touchscreen panel shown in FIG. 23.

Referring also to FIG. 26, an alternative array 56 of sensing/excitation electrodes 46 offset from a regular grid 57 is shown.

Similar to the array 54, the alternative array 56 is based on a regular grid 57. However, unlike the array 54, in the alternative array 56 the electrodes $46_{i,j}$ are not arranged at the grid 57 intersections. Instead, each electrode $46_{i,j}$ is slightly offset from its corresponding grid 57 intersection. For example, a first row of electrodes $46_{1,j}$ are arranged at the grid 57, whereas a second row of electrodes $46_{2,j}$ are offset from the grid intersections in the second direction y so as to be centred on a line 58 which is inclined at an angle θ to the first direction x. The third, fifth and seventh rows of electrodes $46_{3,j}$, $46_{5,j}$, $46_{7,j}$ are each aligned with the grid 57 intersections. The fourth row of electrodes $46_{4,j}$ are offset from the grid 57 in the second direction y so as to be centred on a line 59 which is inclined at an angle −θ to the first direction x. The sixth row of electrodes $46_{6,j}$ are offset from the grid 57 in the second direction y so as to be centred on a line 60 which is inclined at an angle θ to the first direction x, i.e. parallel to the line 58.

In this way, first and second linear arrays of actuators 12, 15 may be provided by selecting appropriate rows of the alternative array 56. For example, an angle of 0 for generating Moiré fringes 16 may be provided by selecting any one of the $1^{st}$, $3^{rd}$, $5^{th}$ or $7^{th}$ rows to provide the first linear array 12 and by selecting any one of the $2^{nd}$, $4^{th}$ or $6^{th}$ rows to provide the second linear array 15. An angle of 2θ may be provided by selecting either one of the $2^{nd}$ or $6^{th}$ rows as the first linear array 12 and the $4^{th}$ row as the second linear array 15. Tuning of the location of the Moiré fringes 16 may be provided by adjustment of the excitation frequencies (see FIGS. 11A to 11F, 12A and 12B).

The alternative array 56 is only one non-limiting example, and the same principles may be applied to smaller or larger arrays of electrodes $46_{i,j}$. The number of angular combinations can be smaller or larger. The electrodes $46_{i,j}$ may be additionally or alternatively offset from the grid in the first direction x, so as to allow generation of Moiré fringes 16 by selecting a pair of columns.

Figure 27:
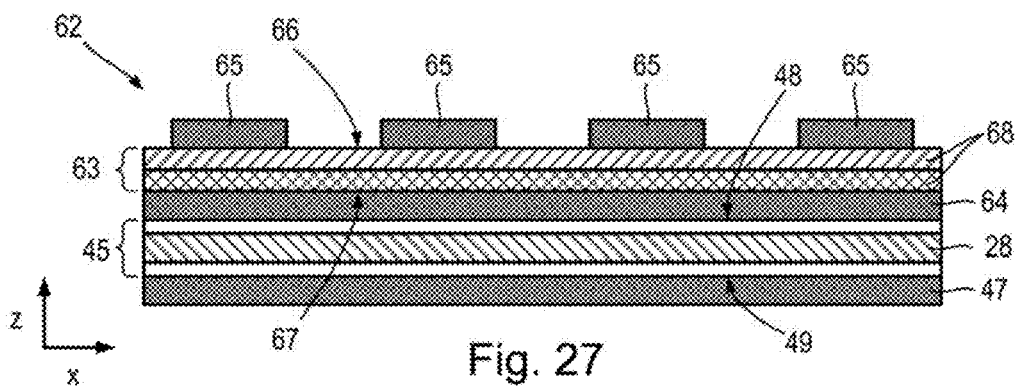
FIG. 27 is cross-section of a third touchscreen panel.
Figure 28:
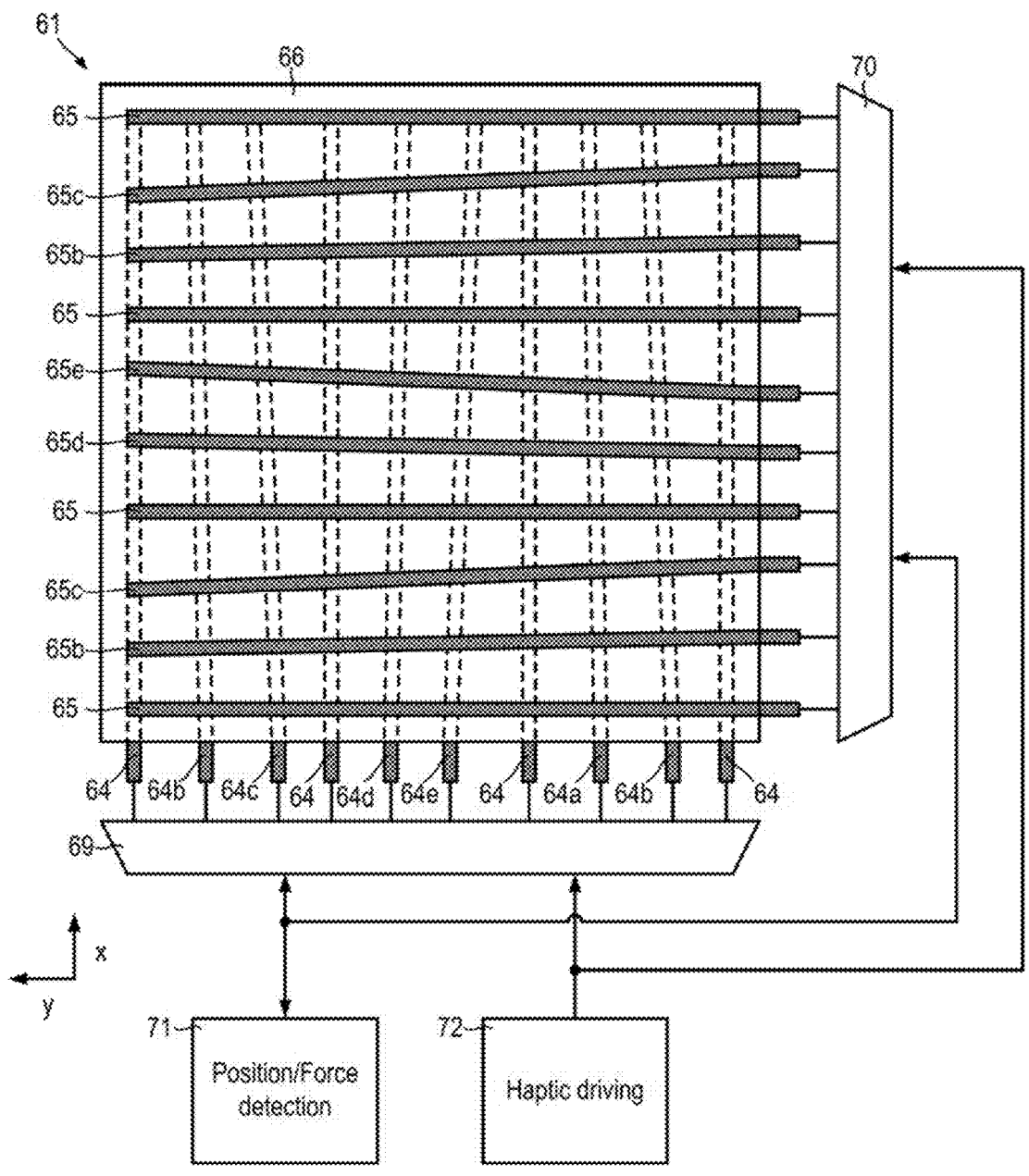
FIG. 28 illustrates a second integrated haptic system.

Second Integrated Haptic System:

Referring also to FIGS. 27 and 28, a second integrated haptic system 61 is shown.

Referring in particular to FIG. 27, the second integrated haptic system 61 includes a third touch panel 62.

The third touch panel 62 includes the first layer structure 45, a second layer structure 63, first sensing/excitation electrodes 64, second sensing/excitation electrodes 65 and the common electrode 47.

The first layer structure 45 has the same structure as in the second touchscreen panel 44. The first sensing/excitation electrodes 64 are disposed on the first face 48 of the first layer structure 45. The second layer structure 63 has a third face 66 and a fourth, opposite, face 67. The second layer structure 63 includes one or more dielectric layers 68. Each dielectric layer 68 is generally planar and extends in first and second directions x, y which are perpendicular to a thickness direction z. The one or more dielectric layers 68 of the second layer structure 63 are arranged between the third and fourth faces 66, 67 such that the thickness direction z of each dielectric layer 68 of the second layer structure 63 is perpendicular to the third and fourth faces 66, 67. The second sensing/excitation electrodes 65 are disposed on the third face 66 of the second layer structure 63, and the fourth face 67 of the second layer structure 63 contacts the first sensing/excitation electrodes 64.

The layer of piezoelectric material 28 may be formed from a piezoelectric polymer, for example a suitable fluoropolymer such as polyvinylidene fluoride (PVDF). The first and second electrodes 64, 65 may be formed using indium tin oxide (ITO) or indium zinc oxide (IZO). The common electrode 47 may be formed from indium tin oxide (ITO) or indium zinc oxide (IZO).

The dielectric layer or layers 68 may be formed from a polymer dielectric material such as polyethylene terephthalate (PET), or from layers of pressure sensitive adhesive (PSA) material.

The first layer structure 63 may include only the layer of piezoelectric material 28, such that the first and second opposite faces 48, 49 are faces of the piezoelectric material layer 28. Alternatively, the first layer structure 45 may include one or more dielectric layers 68 which are stacked between the layer of piezoelectric material 28 and the first face 48 of the first layer structure 45. Additionally or alternatively, the first layer structure 45 may include one or more dielectric layers 68 stacked between the second face 49 of the first layer structure 45 and the layer of piezoelectric material 28.

The second layer structure 63 may include a single dielectric layer 68, such that the third and fourth opposite faces 66, 67 are faces of a single dielectric layer 68. Alternatively, a second layer structure 62 need not be used, and the second electrodes 65 could be disposed on the first face 48 along with the first electrodes 64 (see FIG. 17).

The second integrated haptics system 61 is not limited to the described structure of the third touch panel 62, and the second integrated haptics system 61 may be used in conjunction with any projected capacitance touch panel which includes a layer of piezoelectric material disposed between a number of first and second electrodes 64, 65 and a common electrode 47.

Referring in particular to FIG. 28, the first electrodes 64 each extend generally in the first direction x, and are spaced apart in the second direction y to form an array. However, the first electrodes 64 are not all parallel to one another and may be sub-divided into a number of different types. For example, primary first electrodes 64 may extend parallel to the first direction x, secondary first electrodes 64b, 64d may extend along lines inclined at angles ±θ to the first direction x, and tertiary first electrodes 64c, 64e may extend along lines inclined at angles ±2θ to the first direction x. The mid-points of the first electrodes 64, 64b, 64c, 64d, 64e in the first direction x may be evenly spaced in the second direction y.

Similarly, the second electrodes 65 each extend generally in the second direction y, and are spaced apart in the first direction x to form an array. However, the second electrodes 65 are not all parallel to one another and may be sub-divided into a number of different types. For example, primary second electrodes 65 may extend parallel to the second direction y, secondary second electrodes 65b, 65d may extend along lines inclined at angles ±θ to the second direction y, and tertiary second electrodes 65c, 65e may extend along lines inclined at angles ±2θ to the second direction y. The mid-points of the second electrodes 65, 65b, 65c, 65d, 65e in the second direction y may be evenly spaced in the first direction x. Each intersection of a first electrode 64 with a second electrode 65 effectively provides a touch sensor for capacitive and/or force measurements.

The common electrode 47 is disposed on the second face 49 of the first layer structure and is extensive such that the common electrode 47 at least partially underlies each of the first and second electrodes 64, 65. The common electrode 47 may be substantially coextensive with the second face 49 of the first layer structure 45.

Each first electrode 64 is connected to a first switching circuit 69 and each second electrode 65 is connected to a second switching circuit 70. The common electrode 47 is connected to a common mode voltage of the second integrated haptic system 61.

The first and second switching circuits 69, 70 allow each first and second electrode 64, 65 to be connected to a capacitance/force detection module 71 or a haptic driving module 72. Any number of electrodes 64, 65 may be connected to the capacitance/force detection module 71 at any time and any number of electrodes 64, 65 may be connected to the haptic driving module 72 at any time. In general, a first or second electrode 64, 65 is not connected to the capacitance/force detection module 71 and the haptic driving module 72 at the same time.

The capacitance/force detection module 71 may measures a self-capacitance of a first or second electrode 64, 65 to which it is connected, a mutual capacitance between a pair of a first electrode 64 and a second electrode 65 and/or a force applied proximate to a first or second electrode 64, 65. Examples of apparatus suitable for providing the capacitance/force detection module 71 of the second integrated haptic system 61 have been described in WO 2016/102975 A2, in particular, the examples described with reference to FIG. 21 to 29 of WO 2016/102975 A2 from page 46, line 23 to page 54, line 28. The capacitance/force detection module 71 does not need to measure forces, in which case the capacitance/force detection module 71 may be provided by any suitable projected capacitance controller.

The haptic driving module 72 includes an amplifier circuit, for example, the second bridge tied load circuit 42. Further features and functionality of the haptic driving module 72 shall be described hereinafter.

Localisation of Haptic Vibrations in the Second Integrated Haptic System:

In order to generate Moiré fringes 16, a pair of non-parallel first electrodes 64 or a pair of non-parallel second electrodes 65 may be used instead of the hereinbefore described first and second linear arrays 12, 15.

For example, a pair including one primary first electrode 64 and one secondary electrode 64b, 64d could provide an overall angle of θ for generating Moiré fringes 16. Similarly a pair including one primary first electrode 64 and one tertiary electrode 64c, 64e could provide an overall angle of 2θ. A pair of secondary electrodes 64b, 64d inclined in opposite directions could provide an overall angle of 2θ, and a pair of tertiary electrodes 64c, 64e inclined in opposite directions could provide an overall angle of 4θ. A pair including one secondary electrode 64b, 64d and one tertiary electrode 64c, 64e could provide overall angles of θ or 3θ. In this way, even with fixed electrode 64, 65 geometries, a range of possible angles may be provide permitting a degree of control over the periodicity of Moiré fringes 16 for localising haptic excitations (see FIG. 9A to 9G). Further control over the location and periodicity of generated Moiré fringes 16 may be provided by adjustment of the excitation frequencies (see FIGS. 11A to 11F, 12A and 12B).

The arrangement of first and second electrodes 64, 65 is only one non-limiting example, and the same principles may be applied to smaller or larger arrays of electrodes 64, 65, including more or fewer electrode sub-types 64, 64b, 64c, 64d, 64e. The number of angular combinations can be smaller or larger.

As described hereinbefore, user perceptibility may be provided by using first and second frequencies $f_1$, $f_2$ which differ by a beating frequency $f_B$. For example, a primary first electrode 64 may be driven at the first frequency $f_1$ and a secondary first electrode 64b may be driven at the second frequency $f_2$.

Alternatively, all the electrodes 64, 65 used for generating haptic excitations may be driven using the same carrier signal which is modulated (FIG. 13B) or gated (FIG. 13C) to provide low frequency user perceptibility.

The first or second electrodes 64, 65 selected need not be adjacent to one another.

In use, the capacitance/force detection module 71 measures the locations of one of more touch events corresponding to a user interacting with the third touchscreen panel 62. If haptic excitations are to be generated, the haptic driving module 72 will select a pair of first electrodes 64 or a pair of second electrodes 65 which are located away from the location of the active touch events. The pair of electrodes 64, 65 may be used to generate localised haptic excitations at the locations of the active touch events. The electrodes 64, 65 closer to the touch events may be concurrently used to track the touch events.

The haptic driving module 72 selects the frequencies used, and through the selection of a specific pair of electrodes 64, 65 the angle θ, so as to tune the location and periodicity of the Moiré fringes 16 to correspond to the locations of touch events (see FIGS. 9A to 9G, 11A to 11F, 12A and 12B). As touch events move across the third touchscreen panel 62, the haptic driving module 72 may track the touch event by adjusting the frequencies and/or selecting a new pair of electrodes 64, 65 to vary the angle. If a touch event moves a large enough distance, the haptic driving module 72 may determine a new pair of first or second electrodes 64, 65 to allow continuous tracking of the touch event by the capacitance/force detection module 71.

The haptic driving module 72 is not limited to selecting adjacent pairs of first or second electrodes 64, 65. When a touch event is located in the central regions of the third touch panel 62, it may be advantageous for the haptic driving module 72 to select a pair of first or second electrodes 64, 65 which bracket the touch event. For example, a primary first electrode 64 disposed proximate to one edge of the third touch panel 62 in combination with a secondary first electrode 64b disposed proximate to the opposed edge of the third touch panel 62.

In other examples, the haptic driving module 72 may use two pairs of first or second electrodes 64, 65 to generate Moiré fringes 16 using standing waves. For example, the haptic driving module 72 may select a primary first electrode 64 disposed proximate to one edge of the third touch panel 62 and another primary first electrode 64 disposed proximate to the opposed edge of the third touch panel 62 and drive this pair (with a phase shift if appropriate) so as to generate standing waves producing a pattern of static peaks and troughs between the two primary first electrodes 64. Similarly, a second pattern of standing waves may be generated between a pair of parallel secondary first electrodes 64b, 64d, or between a pair of parallel tertiary first electrodes 64c, 64e bracketing a touch event location. The use of standing waves may allow improved control of haptic vibration localisation.

Figure 29:
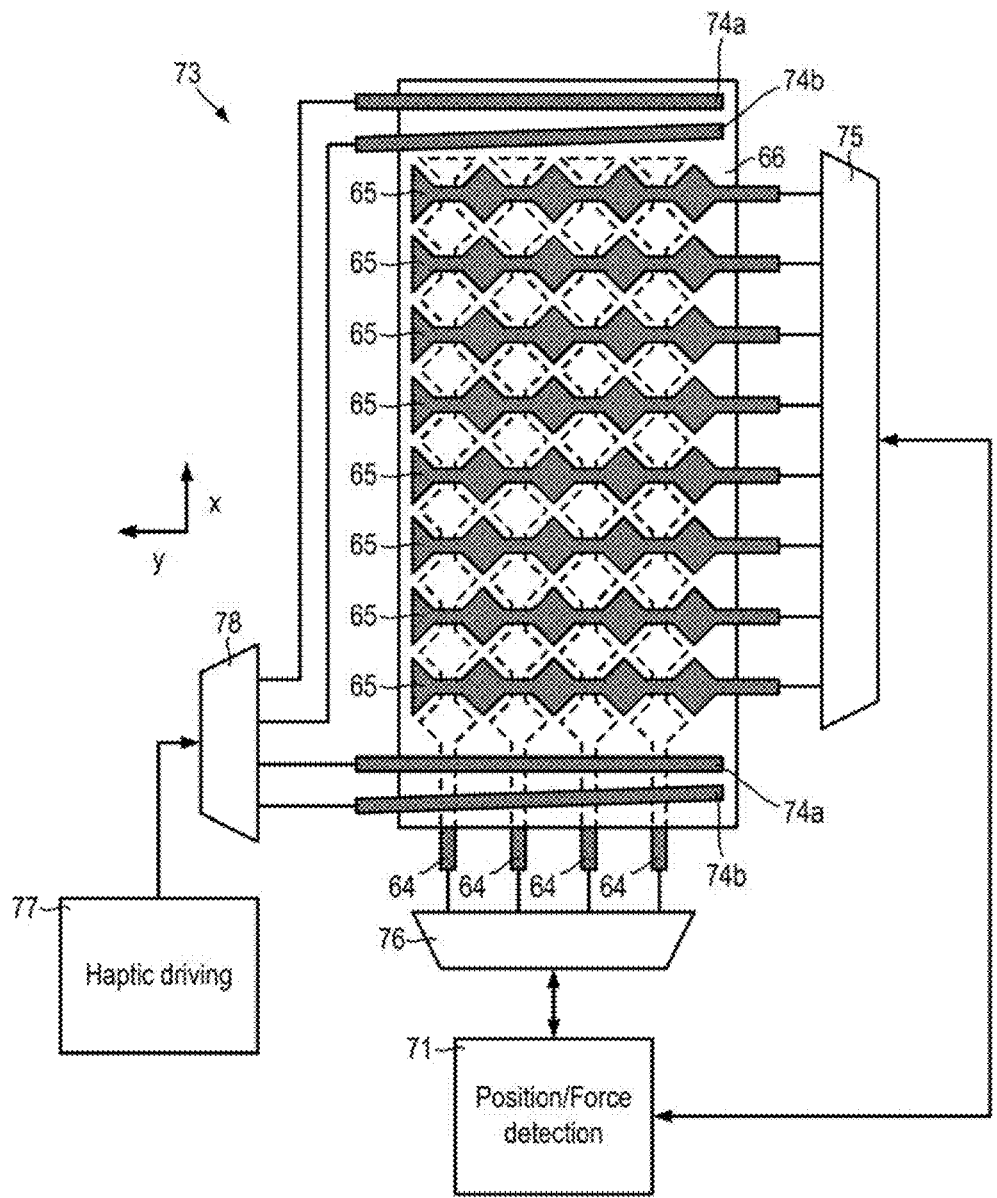
FIG. 29 illustrates a third integrated haptic system.

Third Integrated Haptic System:

Referring also to FIG. 29 a third integrated haptic system 73 is shown.

The third integrated haptic system 73 is the same to the second integrated haptic system 61, except that the first and second electrodes 64, 65 are exclusively used for capacitance and/or force measurements by the position/force detection module 71. Instead, dedicated haptic electrodes 74a, 74b are provided around the edges of the first and second electrodes 64, 65.

In the third integrated haptic system 73, each first electrode 64 extends parallel to the first direction x and the first electrodes 64 are evenly spaced in the second direction y to form a linear array. Each first electrode 64 is connected to the position/force detection module 71 by a first switching circuit 75. In the third integrated haptic system 73, each second electrode 65 extends parallel to the second direction y and the second electrodes 65 are evenly spaced in the first direction x to form a linear array. Each second electrode 65 is connected to the position/force detection module 71 by a second switching circuit 76.

The dedicated haptic electrodes 74a, 74b are disposed on the third face 66 along with the second electrodes 65. Primary haptic electrodes 74a extend parallel to the second direction y. Secondary haptic electrodes 74b extend at an angle θ to the second direction y. In the example shown in FIG. 28, a pair of primary and secondary haptic electrodes 74a, 74b is disposed on either side of the second electrodes 65. Each haptic electrode 74a, 74b is connected to a haptic driving module 77 by a third switching circuit 78.

The haptic driving module 77 selects a frequency or frequencies so as to generate Moiré fringes 16 which are localised to locations of touch events as determined by the position/force detection module 71.

The haptic driving module 71 may generate user perceptible haptic excitations in one of three ways. Firstly, by driving the primary haptic electrodes 74a at a first frequency f1 and the secondary haptic electrodes 74b at a second frequency satisfying $f_1-f_2=f_B$, in which $f_B$ is the desired beating frequency, for example, 200 Hz. Secondly, by driving the primary and secondary haptic electrodes 74a, 74b with a modulated carrier signal 19 having a low frequency envelope (see FIG. 13B). Thirdly, the haptic driving module 71 may generate user perceptible haptic excitations by driving the primary and secondary haptic electrodes 74a, 74b using a gated carrier signal 21 (see FIG. 13C).

Additionally or alternatively, further primary haptic electrodes (not shown) may be provided parallel to the first direction x with corresponding further secondary haptic electrodes (not shown) extending at an angle θ to the first direction x. Haptic electrodes 74a, 74b may be disposed on the first, third or fourth 48, 66, 67. The common electrode 47 should substantially overlap the haptic electrodes.

Alternatively, dedicated haptic electrodes 74a, 74b may be disposed opposite dedicated common electrodes (not shown) having the same shapes as and overlapping the dedicated haptic electrodes 74a, 74b. Dedicated haptic electrodes 74a, 74b and corresponding dedicated common electrodes (not shown) may be disposed on opposed faces 48, 49 of the first layer structure 45, or preferably on opposed sides of the layer of piezoelectric material 28. A smaller separation of dedicated haptic electrodes 74a, 74b and corresponding dedicated common electrodes (not shown) will result in a stronger electric field for a given applied voltage, allowing more powerful/larger amplitude excitations to be generated using lower voltages.

The dedicated haptic electrodes 74a, 74b need not bracket the first and second electrodes 64, 65, and only one pair of a primary haptic electrode 74a and a secondary haptic electrode 74b along one edge of a touchscreen panel is required to generate localised haptic excitations.

Figure 30:
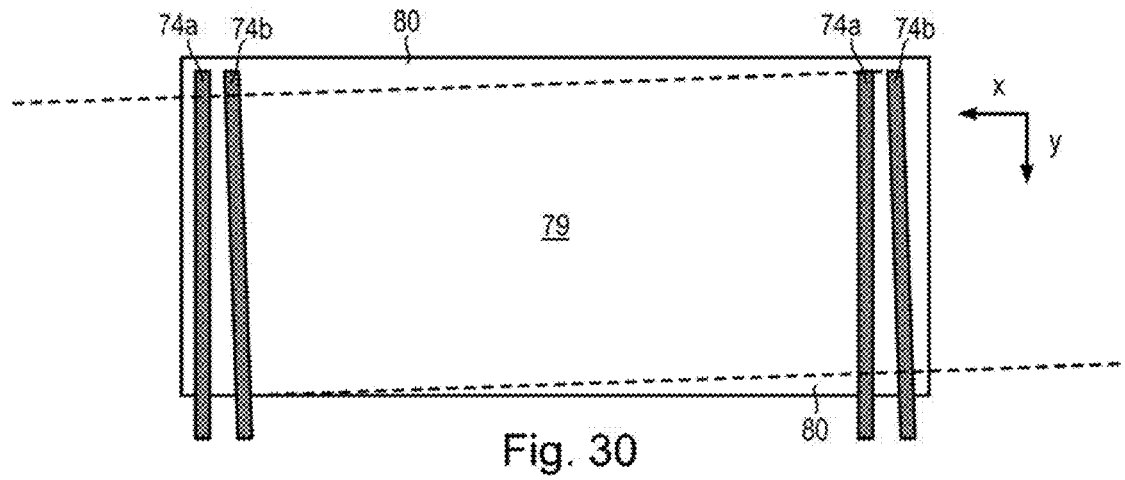
FIG. 30 illustrates generating standing waves using the third integrated haptic system shown in FIG. 29.

However, referring also to FIG. 30, bracketing pairs of primary and secondary haptic electrodes 74a, 74b may be advantageous in some examples.

For example, a pair of primary haptic electrodes 74a disposed on opposite sides of the touchscreen panel may be used to generate standing waves in the first direction x by appropriate selection of excitation frequency and, optionally, applying a phase shirt between the pair of primary haptic electrodes 74a. With appropriate phase shifts between driving signals, the separation of the pair of primary haptic electrodes 74a need not be a whole number of half periods of the wavelength corresponding to the excitation frequency. Similarly, a pair of secondary haptic electrodes 74b disposed on opposite sides of the touchscreen panel may be used to generate standing waves in a direction oriented at an angle θ to the first direction x.

Within an overlap region 79, haptic excitations may be localised in the second direction y using Moiré fringes 16, and in the first direction x by the peaks and troughs of standing waves generated by the pairs of haptic electrodes 74a, 74b. Edge regions 80 will be relatively small because the angle θ between the primary and secondary haptic electrodes 74a, 74b is typically small.

Figure 31:
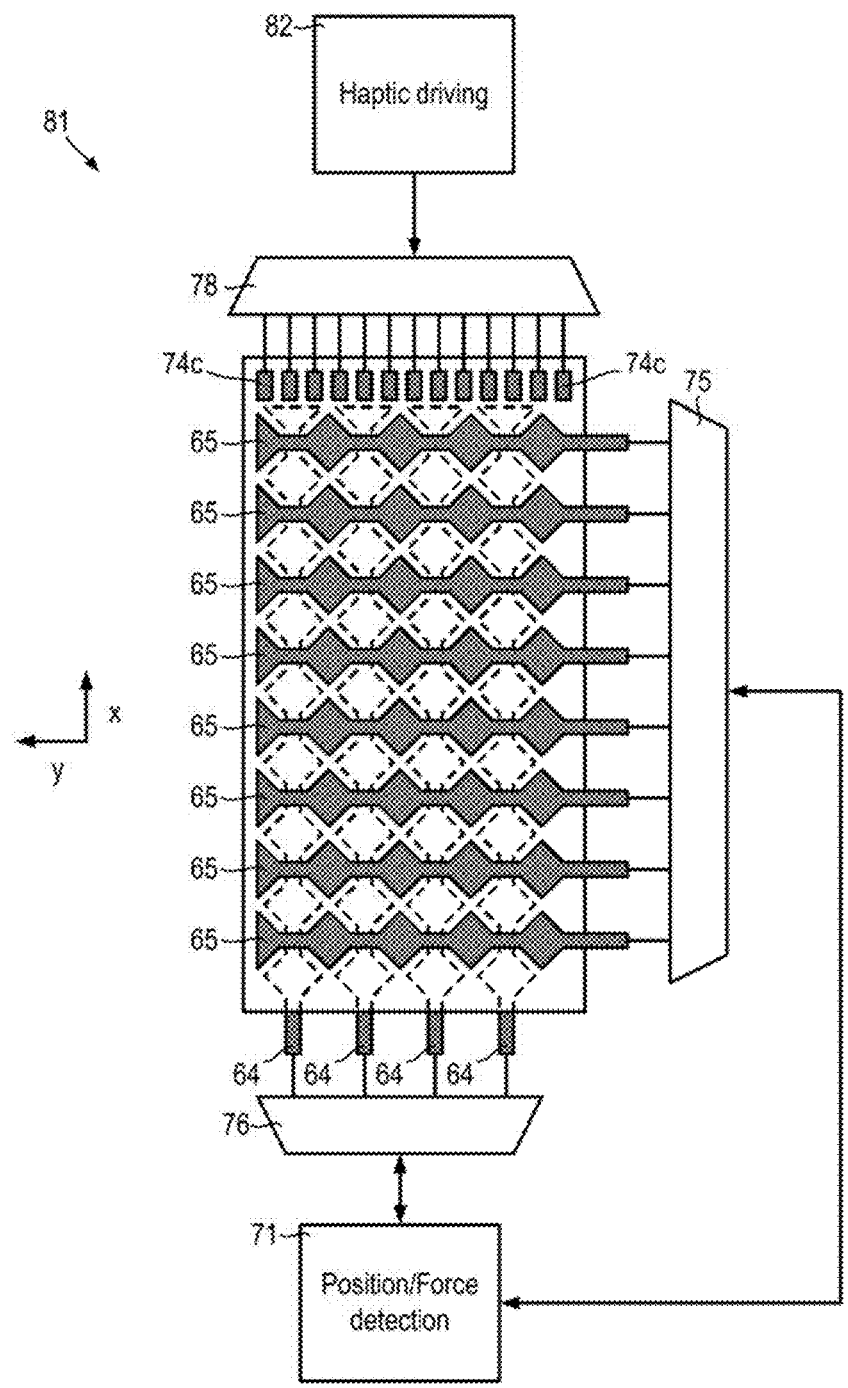
FIG. 31 illustrates a fourth integrated haptic system.

Fourth Integrated Haptic System:

Referring also to FIG. 31 a fourth integrated haptic system 81 is shown.

The fourth integrated haptic system 81 is the same as the third integrated haptic system 73, except that the arrangement of dedicated haptic electrodes 74 is different.

In the fourth integrated haptic system 81, the dedicated haptic electrodes 74 are in the form of dedicated haptic pads 74c disposed along one or more edges of a touchscreen panel and spaced apart evenly in the first direction x or second direction y. In the example shown in FIG. 31, a single array of dedicated haptic pads 74c is spaced apart evenly in the second direction y. Each dedicated haptic pad 74c is connected to a haptic driving module 82 by the third switching circuit 78.

The spatial localisation of haptic excitations in the fourth integrated haptic system 81 is generated by the haptic driving module 82 selecting and exciting a subset of the dedicated haptic pads 74c using a modulate carrier signal 19 (FIG. 13b) or a gated carrier signal 21 (FIG. 13C). As described hereinbefore, the excitations generated by a linear array of actuators is well confined to the length of the line of actuators, giving rise to well defined lobes 13 and inactive regions 14 (FIG. 6). This effect may be utilised in the fourth integrated haptic system 81 by exciting one or more subsets of the dedicated haptic pads 74c which correspond to locations of touch events detected by the position/force detection module 71.

Modifications:

It will be appreciated that many modifications may be made to the embodiments hereinbefore described. Such modifications may involve equivalent and other features which are already known in the design, manufacture and use of touchscreen panels and/or piezoelectric actuators and which may be used instead of or in addition to features already described herein. Features of one embodiment may be replaced or supplemented by features of another embodiment. For example, features of one display stack-up or embedded display stack-up may be replaced or supplemented by features of other display stack-ups and/or other embedded display stack-ups.

Although touchscreen panels 27, 44, 62 have been described which include common electrodes 31, 47, alternative examples of suitable touchscreen panels need not include common electrodes 31, 47. For example, the second touchscreen panel 44 may be modified to replace the common electrode 47 with individual counter electrodes (not shown), each of which is disposed on the second face 49 opposite to and co-extensive with a corresponding sensing/excitation electrode 46. In another example, the third touchscreen panel 62 may be modified to omit the second layer structure 63 and the common electrode 47. Instead, the first sensing/excitation electrodes 64 may be applied to the first face 48 of the first layer structure 45 and the second sensing/excitation electrodes 65 may be applied to the second face 49 of the first layer structure 45.

Integrated haptics systems 43, 61, 73, 8i have been described in which haptic excitations are generated using a layer of piezoelectric material 28 which is also used for force detection. However, alternative examples may employ thin ceramic capacitors to generate haptic excitations.

Figure 32:
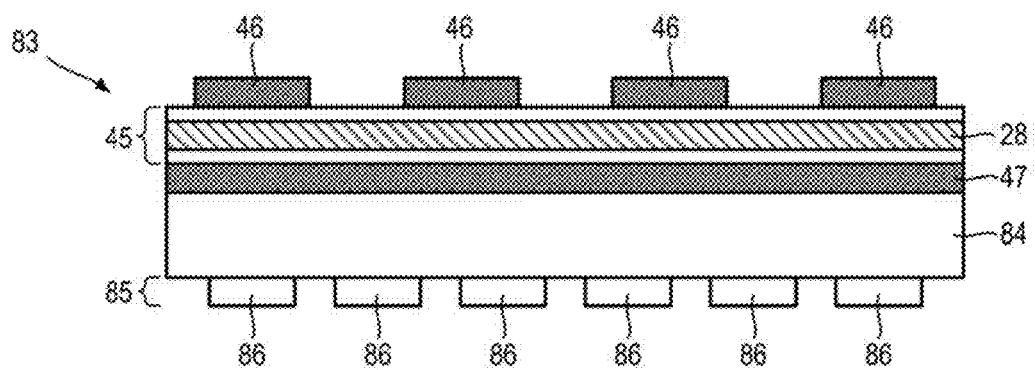
FIG. 32 illustrates a first alternative touchscreen display stack-up.

For example, referring to FIG. 32, a first alternative touchscreen display stack-up 83 is shown.

The first alternative touchscreen display stack-up 83 includes the first layer structure 45 having common electrode 47 and sensing electrodes 46 deposited thereon in the same ways as the first integrated haptic system 43. The first layer structure 45 is laminated to a display module 84 such as, for example, a liquid crystal display (LCD) or organic light emitting diode (OLED) display). An array 85 of ceramic piezoelectric transducers 86 is attached to the underside of the display module 84, opposite to the first layer structure 45.

The array 85 of ceramic piezoelectric transducers 86 takes the same form as either the array of sensing/excitation electrodes 54 or the alternative array of sensing/excitation electrodes 56, and may be used to generate haptic excitations in the same way. The array 85 of ceramic piezoelectric transducers 86 is mounted to the underside of the display module 84 because the ceramic piezoelectric transducers 86 are generally not transparent. Ceramic piezoelectric transducers 86 may be thin, for example 100 micrometres thickness.

The first layer structure 45 may be substituted for a conventional projected capacitive touch panel if force/pressure sensing is not required.

Figure 33:
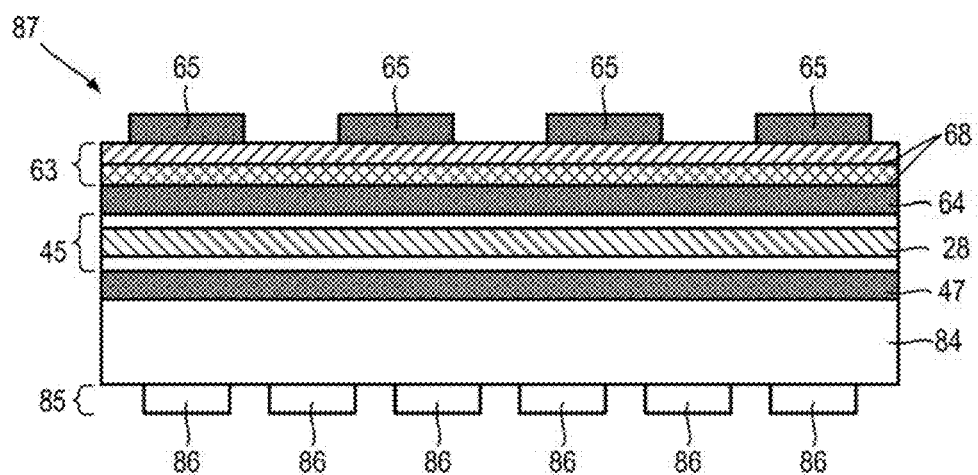
FIG. 33 illustrates a second alternative touchscreen display stack-up.

Referring also to FIG. 33, a second alternative touchscreen display stack-up 87 is shown.

The second alternative touchscreen display stack-up 87 includes the first layer structure 45, the second layer structure 63, the common electrode 47 and first and second sensing electrodes 64, 65. The first layer structure 45 is laminated to the display module 84 in the same way as for the first alternative touchscreen display stack-up 83. The array 85 of ceramic piezoelectric transducers 86 is the same as for the first alternative touchscreen display stack-up 83, and the array 85 is mounted to the underside of the display module 84.

Figure 34:
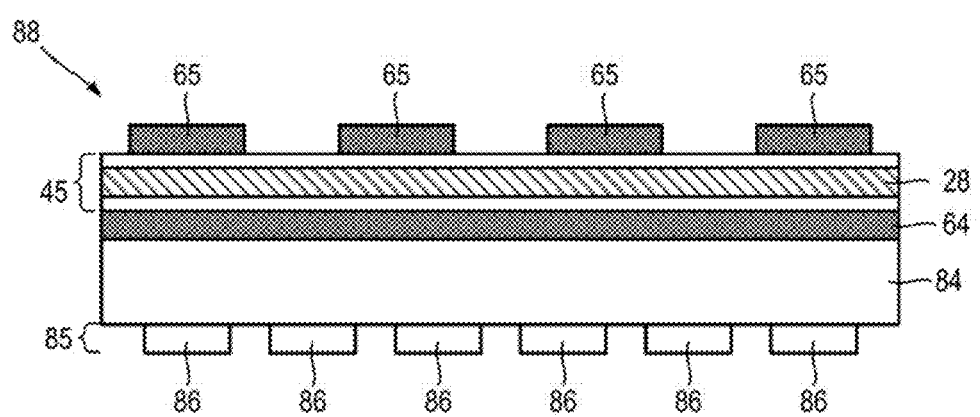
FIG. 34 illustrates a third alternative touchscreen display stack-up.

Referring also to FIG. 34, a third alternative touchscreen display stack-up 88 is shown.

The third alternative touchscreen display stack-up 88 is the same as the second alternative touchscreen display stack-up 87, except that the second layer structure 63 and common electrode 47 are omitted, and the first and second sensing electrodes 64, 65, are disposed on opposite faces of the first layer structure 45.

Figure 35:
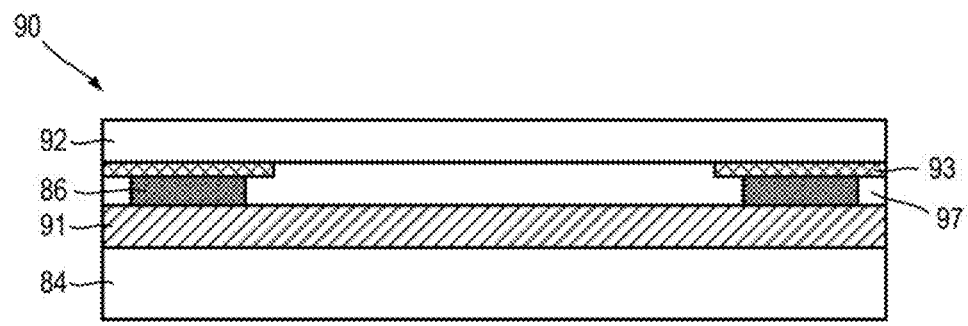
FIG. 35 illustrates a fourth alternative touchscreen display stack-up.
Figure 36:
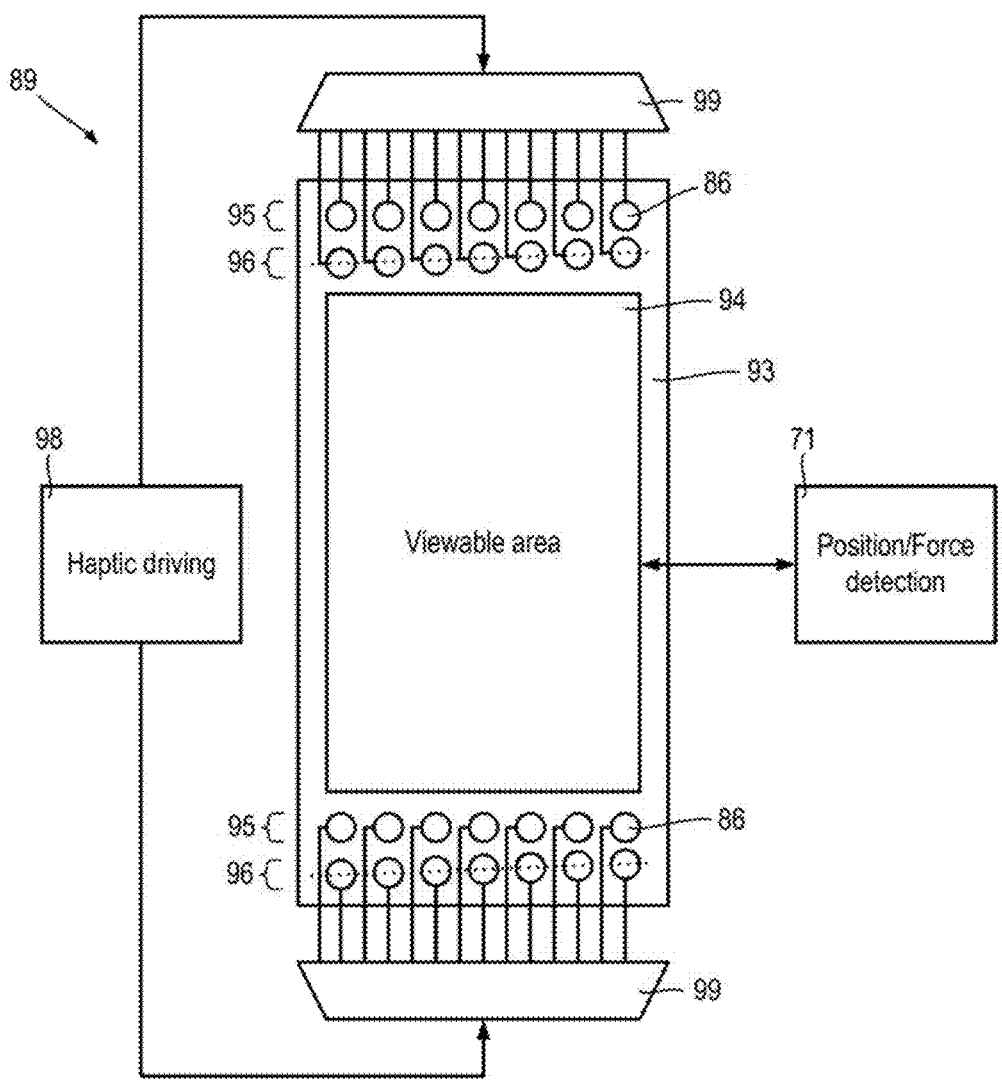
FIG. 36 illustrates an alternative integrated haptic system.

Referring also to FIGS. 35 and 36, an alternative integrated haptic system 89 including a fourth alternative touchscreen display stack-up go is shown.

The fourth alternative touchscreen display stack-up 900 includes a touchscreen panel 91 laminated to the display module 84. The touchscreen panel 91 may be a combined force and capacitance sensing panel such as the first, second or third touchscreen panels 27, 44, 62, or the touchscreen panel 91 may be a purely capacitive touchscreen panel.

The fourth alternative touchscreen display stack-up 900 includes a cover lens 92 having an opaque decoration pattern 93 applied to an inner surface leaving a viewable area 94 which is not covered by the decoration pattern 93. First and second linear arrays 95, 96 of ceramic piezoelectric transducers 86 are sandwiched between the touchscreen panel 91 and cover lens 92 using a layer of pressure-sensitive adhesive (PSA) 97. The first and second linear arrays 95, 96 of ceramic piezoelectric transducers 86 are arranged to be concealed under the decoration pattern 93.

A pair of first linear arrays 95 bracket the viewable area 94, and a pair of second linear arrays 96 also bracket the viewable area 94. The second linear arrays 96 are inclined at an angle θ to the first linear arrays 95 in order to permit localisation of haptic excitations using Moiré fringes 16 as described hereinbefore. The individual ceramic piezoelectric transducers 86 are connected to haptic driving module 98 via switching circuits 99. The haptic driving module 98 operates analogously to haptic driving module 77 so as to generate haptic excitations in the same way as the third integrated haptic system 73.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. A touchscreen system for generating localised haptic excitations, comprising:
   a touchscreen panel for measuring force and/or capacitance;
   one or more first piezoelectric transducers arranged along a first line to generate first excitations in the touchscreen panel;
   one or more second piezoelectric transducers arranged along a second line to generate second excitations in the touchscreen panel, wherein the second line is inclined to the first line at an angle;
   a pressure and/or capacitance sensing module connected to the touchscreen panel and configured to measure a force and/or capacitance from the touchscreen panel;
   a haptic driving module connected to the first and second piezoelectric transducers and configured to generate user perceptible haptic excitation by:
   driving the first piezoelectric transducers at a first frequency exceeding 20 kHz, and driving the second piezoelectric transducers at a second frequency exceeding 20 kHz, wherein the difference of the first and second frequencies is a beating frequency, and the beating frequency is between 80 Hz and 400 Hz; or
   driving the first and second piezoelectric transducers at a carrier frequency exceeding 20 kHz, the carrier frequency being is modulated at a modulation frequency which is between 80 Hz and 400 Hz;
   wherein the angle causes spatial Moiré fringes between the first
   and second excitations.

2. A touchscreen system according to claim 1, wherein the haptic driving module is further configured to:
   control the spacing of the Moiré fringes by selecting the first and second frequencies in dependence upon the angle; or
   control the spacing of the Moiré fringes by selecting the carrier frequency in dependence upon the angle.

3. A touchscreen system according to claim 1, further comprising one or more third piezoelectric transducers arranged along a third line to generate third excitations in the touchscreen panel, wherein the third line is inclined to the first line at a second angle, wherein the second angle is different to the angle;
   wherein the haptic driving module is further connected to the third piezoelectric transducers, wherein the haptic driving module is further configured to control the spacing of the Moiré fringes by:
   driving the first piezoelectric transducers at the first frequency and driving the second piezoelectric transducers at a second frequency, or driving the first and second piezoelectric transducers at the carrier frequency modulated at the modulation frequency;

driving the first piezoelectric transducers at the first frequency and driving the third piezoelectric transducers at a second frequency, or driving the first and third piezoelectric transducers at the carrier frequency modulated at the modulation frequency; or driving the second piezoelectric transducers at the first frequency and driving the third piezoelectric transducers at a second frequency, or driving the second and third piezoelectric transducers at the carrier frequency modulated at the modulation frequency.

4. A touchscreen system according to claim 3, wherein the haptic driving module is further configured to:

control the spacing of the Moiré fringes by selecting the first and second frequencies in dependence upon the angle, the second angle or a difference between the angle and the second angle; or control the spacing of the Moiré fringes by selecting the carrier frequency in dependence upon the angle, the second angle or a difference between the angle and the second angle.

5. A touchscreen system according to claim 1, wherein each of the first and second piezoelectric transducers is a discrete ceramic piezoelectric transducer.

6. A touchscreen system according to claim 1, wherein the touchscreen panel comprises:

a plurality of first electrodes;
at least one second electrode; and
a layer of piezoelectric material arranged between the first and second electrodes;
wherein each of the first and second piezoelectric transducers comprises one of the first electrodes, at least one second electrode and the layer of piezoelectric material.

7. A touchscreen system according to claim 6, wherein each first electrode is connected to the haptic driving module and the pressure and/or capacitance sensing module by a switching circuit;

wherein each first electrode is used for measuring force and/or capacitance.

8. A touchscreen system according to claim 1, wherein the beating frequency or modulation frequency is substantially equal to 200 Hz.

9. A touchscreen system according to claim 1, wherein the carrier frequency is modulated at the modulation frequency using a sinusoidal envelope.

10. A touchscreen system according to claim 1, wherein the carrier frequency is modulated at the modulation frequency using a square wave envelope.

11. A touchscreen system for generating localised haptic excitations, comprising:

a touchscreen panel for measuring force and/or capacitance;
an array of piezoelectric transducers arranged in rows and columns;
wherein the touchscreen system is configured to select first piezoelectric transducers corresponding to a first row or column of the array;
wherein the touchscreen system is configured to select second piezoelectric transducers corresponding to a second, different row or column;
a pressure and/or capacitance sensing module connected to the touchscreen panel and configured to measure a force and/or capacitance from the touchscreen panel;
a haptic driving module connected to the first and second piezoelectric transducers and configured to generate user perceptible haptic excitation by:
driving the first piezoelectric transducers at a first frequency exceeding 20 kHz, and driving the second piezoelectric transducers at a second frequency exceeding 20 kHz, wherein the difference of the first and second frequencies is a beating frequency, and the beating frequency is between 80 Hz and 400 Hz; or
driving the first and second piezoelectric transducers at a carrier frequency exceeding 20 kHz, the carrier frequency being modulated at a modulation frequency which is between 80 Hz and 400 Hz;
wherein the haptic driving module is configured to drive the first piezoelectric transducers in phase to generate first excitations in the touch panel along a line corresponding to the first row or column;
wherein the haptic driving module is configured to drive the second piezoelectric transducers by applying a different phase shift to the driving signal for each of the second piezoelectric transducers, so as to generate second excitations in the touchscreen panel having an implied origin along a second line which is inclined to the first line at an angle, wherein the phase shift for each second piezoelectric transducer depends on a perpendicular distance of that second piezoelectric transducer from the second line;
wherein the angle causes spatial Moiré fringes between the first and second excitations.

12. A touchscreen system according to claim 11, wherein the haptic driving module is further configured to:

control the spacing of the Moiré fringes by selecting the first and second frequencies in dependence upon the angle; or control the spacing of the Moiré fringes by selecting the carrier frequency in dependence upon the angle.

* * * * *